United States Patent
Gordon et al.

(10) Patent No.: US 9,042,454 B2
(45) Date of Patent: May 26, 2015

(54) INTERACTIVE ENCODED CONTENT SYSTEM INCLUDING OBJECT MODELS FOR VIEWING ON A REMOTE DEVICE

(75) Inventors: Donald Gordon, Mountain View, CA (US); Lena Y. Pavlovskaia, Cupertino, CA (US); Airan Landau, San Jose, CA (US); Andreas Lennartsson, Manchester, MD (US); Charlie Lawrence, Fremont, CA (US); Greg Brown, Fremont, CA (US); Edward Ludvig, Redwood City, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 1192 days.

(21) Appl. No.: 12/008,697

(22) Filed: Jan. 11, 2008

(65) Prior Publication Data
US 2008/0170622 A1 Jul. 17, 2008

Related U.S. Application Data

(60) Provisional application No. 60/884,773, filed on Jan. 12, 2007, provisional application No. 60/884,744, filed on Jan. 12, 2007, provisional application No. 60/884,772, filed on Jan. 12, 2007.

(51) Int. Cl.
*H04N 21/8543* (2011.01)
*H04N 21/234* (2011.01)
(Continued)

(52) U.S. Cl.
CPC ..... *H04N 21/8543* (2013.01); *H04N 21/23412* (2013.01); *H04N 21/23424* (2013.01);
(Continued)

(58) Field of Classification Search
CPC . H04N 7/26888; H04N 7/50; H04N 7/26244; H04N 5/145; H04N 21/8543; H04N 19/527; H04N 19/23; H04N 19/48; H04N 21/2368; H04N 21/23412; H04N 21/4722; H04N 21/4347; H04N 21/44012; H04N 21/2365; H04N 21/2343; H04N 21/812; H04N 21/23424; H04N 21/4316
USPC .................. 375/240, 240.01, 240.12, 240.16, 375/240.18, 240.26, 240.29
See application file for complete search history.

(56) References Cited

U.S. PATENT DOCUMENTS 3,889,050 A 6/1975 Thompson
3,934,079 A 1/1976 Barnhart
(Continued)

FOREIGN PATENT DOCUMENTS

AT 191599 T 4/2000
AT 198969 T 2/2001
(Continued)

OTHER PUBLICATIONS

Authorized Officer Jürgen Güttlich, International Search Report and Written Opinion, dated Jan. 12, 2007, PCT/US2008/000400.
(Continued)

*Primary Examiner* — Obaidul Huq
(74) *Attorney, Agent, or Firm* — Morgan, Lewis & Bockius LLP

(57) ABSTRACT

A system for creating composite encoded video from two or more encoded video sources in the encoded domain. In response to user input, a markup language-based graphical layout is retrieved. The graphical layout includes frame locations within a composite frame for at least a first encoded source and a second encoded source. The system either retrieves or receives the first and second encoded sources. The sources include block-based transform encoded data. The system also includes a stitcher module for stitching together the first encoded source and the second encoded source according to the frame locations of the graphical layout to form an encoded frame. The system outputs an encoded video stream that is transmitted to a client device associated with the user. In response to further user input, the system updates the state of an object model and replaces all or a portion of one or more frames of the encoded video stream. The system may be used with MPEG encoded video.

15 Claims, 30 Drawing Sheets

(51) Int. Cl.

| | |
|---|---|
| H04N 21/2343 | (2011.01) |
| H04N 21/2365 | (2011.01) |
| H04N 21/431 | (2011.01) |
| H04N 21/434 | (2011.01) |
| H04N 21/44 | (2011.01) |
| H04N 21/4722 | (2011.01) |
| H04N 21/81 | (2011.01) |
| H04N 21/2368 | (2011.01) |
| H04N 19/48 | (2014.01) |
| H04N 19/23 | (2014.01) |
| H04N 19/527 | (2014.01) |

(52) U.S. Cl.
CPC ....... *H04N21/2343* (2013.01); *H04N 21/2365* (2013.01); *H04N 21/4316* (2013.01); *H04N 21/4347* (2013.01); *H04N 21/44012* (2013.01); *H04N 21/4722* (2013.01); *H04N 21/812* (2013.01); *H04N 21/2368* (2013.01); *H04N 19/48* (2014.11); *H04N 19/23* (2014.11); *H04N 19/527* (2014.11)

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweety et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. .................. 358/84 |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |

(56) References Cited

U.S. PATENT DOCUMENTS

| | | |
|---|---|---|
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hornbaker, III et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. ............ 358/86 |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Litteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. ............ 348/7 |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. ............ 348/7 |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty ............ 380/15 |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty ............ 348/7 |
| 5,487,066 A | 1/1996 | McNamara et al. |
| 5,493,638 A | 2/1996 | Hooper et al. ............ 395/135 |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. ............ 348/7 |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. ............ 348/7 |
| 5,557,316 A | 9/1996 | Hoarty et al. ............ 348/7 |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty ............ 348/584 |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,742,289 A | 4/1998 | Naylor et al. |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. ............ 380/10 |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty ............ 348/7 |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,959,690 A | 9/1999 | Toebes, et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmussen |
| 5,995,488 A | 11/1999 | Kalkunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty et al. ............ 345/327 |
| 6,049,539 A | 4/2000 | Lee et al. |
| 6,049,831 A | 4/2000 | Gardell et al. |
| 6,052,555 A | 4/2000 | Ferguson |
| 6,055,314 A | 4/2000 | Spies et al. |
| 6,055,315 A | 4/2000 | Doyle et al. |
| 6,064,377 A | 5/2000 | Hoarty et al. ............ 345/327 |
| 6,078,328 A | 6/2000 | Schumann et al. |
| 6,084,908 A | 7/2000 | Chiang et al. |
| 6,100,883 A | 8/2000 | Hoarty ............ 345/327 |
| 6,108,625 A | 8/2000 | Kim |
| 6,131,182 A | 10/2000 | Beakes et al. |
| 6,141,645 A | 10/2000 | Chi-Min et al. |
| 6,141,693 A | 10/2000 | Perlman et al. |
| 6,144,698 A * | 11/2000 | Poon et al. ............ 375/240.16 |
| 6,167,084 A | 12/2000 | Wang et al. |
| 6,169,573 B1 | 1/2001 | Sampath-Kumar et al. |
| 6,177,931 B1 | 1/2001 | Alexander et al. |
| 6,182,072 B1 | 1/2001 | Leak et al. |
| 6,184,878 B1 | 2/2001 | Alonso et al. |
| 6,192,081 B1 | 2/2001 | Chiang et al. |
| 6,198,822 B1 | 3/2001 | Doyle et al. |
| 6,205,582 B1 | 3/2001 | Hoarty ............ 725/93 |
| 6,226,041 B1 | 5/2001 | Florencio et al. |

(56) References Cited

U.S. PATENT DOCUMENTS

| | | | |
|---|---|---|---|
| 6,236,730 B1 | 5/2001 | Cowieson et al. | |
| 6,243,418 B1 | 6/2001 | Kim | |
| 6,253,238 B1 | 6/2001 | Lauder et al. | |
| 6,253,375 B1 | 6/2001 | Gordon et al. | 725/88 |
| 6,256,047 B1 | 7/2001 | Isobe et al. | |
| 6,259,826 B1 | 7/2001 | Pollard et al. | |
| 6,266,369 B1 | 7/2001 | Wang et al. | |
| 6,266,684 B1 | 7/2001 | Kraus et al. | |
| 6,275,496 B1 | 8/2001 | Burns et al. | |
| 6,292,194 B1 | 9/2001 | Powell, III | |
| 6,305,020 B1 | 10/2001 | Hoarty et al. | 725/95 |
| 6,310,915 B1 * | 10/2001 | Wells et al. | 375/240.03 |
| 6,317,151 B1 | 11/2001 | Ohsuga et al. | |
| 6,317,885 B1 | 11/2001 | Fries | |
| 6,324,217 B1 | 11/2001 | Gordon | 375/240.28 |
| 6,349,284 B1 | 2/2002 | Park et al. | |
| 6,385,771 B1 | 5/2002 | Gordon | |
| 6,386,980 B1 | 5/2002 | Nishino et al. | |
| 6,389,075 B2 | 5/2002 | Wang et al. | |
| 6,389,218 B2 | 5/2002 | Gordon et al. | |
| 6,415,031 B1 | 7/2002 | Colligan et al. | |
| 6,415,437 B1 | 7/2002 | Ludvig et al. | |
| 6,438,140 B1 | 8/2002 | Jungers et al. | |
| 6,446,037 B1 | 9/2002 | Fielder et al. | |
| 6,459,427 B1 | 10/2002 | Mao et al. | |
| 6,477,182 B2 | 11/2002 | Calderone | |
| 6,481,012 B1 | 11/2002 | Gordon et al. | 725/54 |
| 6,512,793 B1 | 1/2003 | Maeda | |
| 6,525,746 B1 | 2/2003 | Lau et al. | |
| 6,536,043 B1 | 3/2003 | Guedalia | |
| 6,557,041 B2 | 4/2003 | Mallart | |
| 6,560,496 B1 | 5/2003 | Michener | |
| 6,564,378 B1 | 5/2003 | Satterfield et al. | |
| 6,579,184 B1 | 6/2003 | Tanskanen | |
| 6,584,153 B1 | 6/2003 | Comito et al. | 375/240.13 |
| 6,588,017 B1 | 7/2003 | Calderone | |
| 6,598,229 B2 | 7/2003 | Smyth et al. | |
| 6,604,224 B1 | 8/2003 | Armstrong et al. | |
| 6,606,746 B1 * | 8/2003 | Zdepski et al. | 725/37 |
| 6,614,442 B1 | 9/2003 | Ouyang et al. | |
| 6,614,843 B1 | 9/2003 | Gordon et al. | 375/240.01 |
| 6,621,870 B1 | 9/2003 | Gordon et al. | 375/240.28 |
| 6,625,574 B1 | 9/2003 | Taniguchi et al. | |
| 6,639,896 B1 | 10/2003 | Goode et al. | |
| 6,645,076 B1 | 11/2003 | Sugai | |
| 6,651,252 B1 | 11/2003 | Gordon et al. | 725/54 |
| 6,657,647 B1 | 12/2003 | Bright | |
| 6,675,385 B1 | 1/2004 | Wang | |
| 6,675,387 B1 | 1/2004 | Boucher | |
| 6,681,326 B2 | 1/2004 | Son et al. | |
| 6,681,397 B1 | 1/2004 | Tsai et al. | |
| 6,684,400 B1 | 1/2004 | Goode et al. | |
| 6,687,663 B1 | 2/2004 | McGrath et al. | |
| 6,691,208 B2 | 2/2004 | Dandrea et al. | |
| 6,697,376 B1 | 2/2004 | Son et al. | |
| 6,704,359 B1 | 3/2004 | Bayrakeri et al. | |
| 6,717,600 B2 | 4/2004 | Dutta et al. | |
| 6,718,552 B1 | 4/2004 | Goode | |
| 6,721,794 B2 | 4/2004 | Taylor et al. | |
| 6,721,956 B2 | 4/2004 | Wasilewski | |
| 6,727,929 B1 | 4/2004 | Bates et al. | |
| 6,732,370 B1 | 5/2004 | Gordon et al. | 725/39 |
| 6,747,991 B1 | 6/2004 | Hemy et al. | |
| 6,754,271 B1 | 6/2004 | Gordon et al. | 375/240.12 |
| 6,754,905 B2 | 6/2004 | Gordon et al. | 725/38 |
| 6,758,540 B1 | 7/2004 | Adolph et al. | |
| 6,766,407 B1 | 7/2004 | Lisitsa et al. | |
| 6,771,704 B1 | 8/2004 | Hannah | |
| 6,785,902 B1 | 8/2004 | Zigmond et al. | |
| 6,807,528 B1 | 10/2004 | Truman et al. | |
| 6,810,528 B1 | 10/2004 | Chatani | |
| 6,817,947 B2 | 11/2004 | Tanskanen | |
| 6,886,178 B1 | 4/2005 | Mao et al. | |
| 6,907,574 B2 | 6/2005 | Xu et al. | |
| 6,931,291 B1 | 8/2005 | Alvarez-Tinoco et al. | |
| 6,934,965 B2 | 8/2005 | Gordon et al. | 725/54 |
| 6,941,019 B1 | 9/2005 | Mitchell et al. | |
| 6,941,574 B1 | 9/2005 | Broadwin et al. | |
| 6,947,509 B1 * | 9/2005 | Wong | 375/350 |
| 6,952,221 B1 | 10/2005 | Holtz et al. | |
| 6,956,899 B2 | 10/2005 | Hall et al. | |
| 7,030,890 B1 | 4/2006 | Jouet et al. | |
| 7,050,113 B2 | 5/2006 | Campisano et al. | |
| 7,089,577 B1 | 8/2006 | Rakib et al. | |
| 7,095,402 B2 | 8/2006 | Kunil et al. | |
| 7,114,167 B2 | 9/2006 | Slemmer et al. | |
| 7,124,424 B2 | 10/2006 | Gordon et al. | 725/43 |
| 7,146,615 B1 | 12/2006 | Hervet et al. | |
| 7,146,628 B1 | 12/2006 | Gordon et al. | 725/54 |
| 7,158,676 B1 | 1/2007 | Rainsford | |
| 7,200,836 B2 | 4/2007 | Brodersen et al. | |
| 7,212,573 B2 | 5/2007 | Winger | |
| 7,224,731 B2 | 5/2007 | Mehrotra | |
| 7,272,556 B1 | 9/2007 | Aguilar et al. | |
| 7,310,619 B2 | 12/2007 | Baar et al. | |
| 7,325,043 B1 | 1/2008 | Rosenberg et al. | |
| 7,346,111 B2 | 3/2008 | Winger et al. | |
| 7,360,230 B1 | 4/2008 | Paz et al. | |
| 7,412,423 B1 | 8/2008 | Asano | |
| 7,412,505 B2 | 8/2008 | Slemmer et al. | |
| 7,421,082 B2 | 9/2008 | Kamiya et al. | |
| 7,444,306 B2 | 10/2008 | Varble | |
| 7,444,418 B2 | 10/2008 | Chou et al. | |
| 7,500,235 B2 | 3/2009 | Maynard et al. | |
| 7,508,941 B1 | 3/2009 | O'Toole, Jr. et al. | |
| 7,512,577 B2 | 3/2009 | Slemmer et al. | |
| 7,543,073 B2 | 6/2009 | Chou et al. | |
| 7,596,764 B2 | 9/2009 | Vienneau et al. | |
| 7,623,575 B2 | 11/2009 | Winger | |
| 7,669,220 B2 | 2/2010 | Goode | |
| 7,742,609 B2 | 6/2010 | Yeakel et al. | |
| 7,743,400 B2 * | 6/2010 | Kurauchi | 725/114 |
| 7,751,572 B2 | 7/2010 | Villemoes et al. | |
| 7,757,157 B1 | 7/2010 | Fukuda | |
| 7,830,388 B1 | 11/2010 | Lu | |
| 7,840,905 B1 | 11/2010 | Weber et al. | |
| 7,936,819 B2 | 5/2011 | Craig et al. | |
| 7,970,263 B1 | 6/2011 | Asch | |
| 7,987,489 B2 | 7/2011 | Krzyzanowski et al. | |
| 8,027,353 B2 | 9/2011 | Damola et al. | |
| 8,036,271 B2 | 10/2011 | Winger et al. | |
| 8,046,798 B1 | 10/2011 | Schlack et al. | |
| 8,074,248 B2 | 12/2011 | Sigmon et al. | |
| 8,118,676 B2 | 2/2012 | Craig et al. | |
| 8,136,033 B1 | 3/2012 | Bhargava et al. | |
| 8,149,917 B2 | 4/2012 | Zhang et al. | |
| 8,155,194 B2 | 4/2012 | Winger et al. | |
| 8,155,202 B2 | 4/2012 | Landau | |
| 8,170,107 B2 | 5/2012 | Winger | |
| 8,194,862 B2 | 6/2012 | Herr et al. | |
| 8,243,630 B2 | 8/2012 | Luo et al. | |
| 8,270,439 B2 | 9/2012 | Herr et al. | |
| 8,284,842 B2 | 10/2012 | Craig et al. | |
| 8,296,424 B2 | 10/2012 | Malloy et al. | |
| 8,370,869 B2 | 2/2013 | Paek et al. | |
| 8,411,754 B2 | 4/2013 | Zhang et al. | |
| 8,442,110 B2 | 5/2013 | Pavlovskaia et al. | |
| 8,473,996 B2 | 6/2013 | Gordon et al. | |
| 8,619,867 B2 | 12/2013 | Craig et al. | |
| 8,621,500 B2 | 12/2013 | Weaver et al. | |
| 2001/0008845 A1 | 7/2001 | Kusuda et al. | |
| 2001/0049301 A1 | 12/2001 | Masuda et al. | |
| 2002/0007491 A1 | 1/2002 | Schiller et al. | |
| 2002/0013812 A1 | 1/2002 | Krueger et al. | |
| 2002/0016161 A1 | 2/2002 | Dellien et al. | |
| 2002/0021353 A1 | 2/2002 | DeNies | |
| 2002/0026642 A1 | 2/2002 | Augenbraun et al. | |
| 2002/0027567 A1 | 3/2002 | Niamir | |
| 2002/0032697 A1 | 3/2002 | French et al. | |
| 2002/0040482 A1 | 4/2002 | Sextro et al. | |
| 2002/0047899 A1 | 4/2002 | Son et al. | |
| 2002/0049975 A1 | 4/2002 | Thomas et al. | |
| 2002/0056083 A1 | 5/2002 | Istvan | |
| 2002/0056107 A1 | 5/2002 | Schlack | |

(56) References Cited

U.S. PATENT DOCUMENTS

| | | |
|---|---|---|
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0066101 A1 | 5/2002 | Gordon et al. ............... 725/43 |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1* | 4/2003 | Shen et al. ............... 375/240.16 |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Clancy |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Kuczynski-Brown |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0078822 A1 | 4/2004 | Breen et al. |
| 2004/0088375 A1 | 5/2004 | Sethi et al. |
| 2004/0091171 A1* | 5/2004 | Bone ........................... 382/284 |
| 2004/0111526 A1* | 6/2004 | Baldwin et al. ............ 709/231 |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1* | 4/2005 | Paz et al. ........................ 725/110 |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1* | 6/2005 | Kelly et al. ............... 375/240.16 |
| 2005/0149988 A1 | 7/2005 | Grannan |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1* | 2/2006 | Shen et al. ............... 375/240.25 |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Chou et al. |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0239563 A1* | 10/2006 | Chebil et al. ................ 382/232 |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0147804 A1* | 6/2007 | Zhang et al. ................ 386/131 |
| 2007/0152984 A1 | 7/2007 | Ording et al. |
| 2007/0172061 A1 | 7/2007 | Pinder |
| 2007/0174790 A1 | 7/2007 | Jing et al. |
| 2007/0178243 A1 | 8/2007 | Dong et al. |
| 2007/0237232 A1 | 10/2007 | Chang et al. |
| 2007/0300280 A1 | 12/2007 | Turner et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0094368 A1 | 4/2008 | Ording et al. |
| 2008/0098450 A1 | 4/2008 | Wu et al. |

(56) References Cited

U.S. PATENT DOCUMENTS

| | | |
|---|---|---|
| 2008/0104520 A1* | 5/2008 | Swenson et al. ............ 715/738 |
| 2008/0127255 A1 | 5/2008 | Ress et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178243 A1 | 7/2008 | Dong et al. |
| 2008/0178249 A1 | 7/2008 | Gordon et al. |
| 2008/0187042 A1* | 8/2008 | Jasinschi ............... 375/240.03 |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Gossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverley et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | Deluca et al. |
| 2010/0254370 A1 | 10/2010 | Jana et al. |
| 2010/0325655 A1 | 12/2010 | Perez |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1 | 4/2011 | Chen et al. |
| 2011/0107375 A1 | 5/2011 | Stahl et al. |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0243024 A1 | 10/2011 | Osterling et al. |
| 2011/0258584 A1 | 10/2011 | Williams et al. |
| 2011/0289536 A1 | 11/2011 | Poder et al. |
| 2011/0317982 A1 | 12/2011 | Xu et al. |
| 2012/0023126 A1 | 1/2012 | Jin et al. |
| 2012/0030212 A1 | 2/2012 | Koopmans et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0272394 A1 | 10/2013 | Brockmann et al. |
| 2014/0033036 A1 | 1/2014 | Gaur et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |

(56) References Cited

FOREIGN PATENT DOCUMENTS

| | | |
|---|---|---|
| DE | 4408355 A1 | 10/1994 |
| DE | 69516139 D1 | 12/2000 |
| DE | 69132518 D1 | 9/2001 |
| DE | 69333207 D1 | 7/2004 |
| DE | 98961961 T1 | 8/2007 |
| DE | 602008001596 D1 | 8/2010 |
| DE | 602006015650 D1 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 | 4/1992 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1 725 044 A2 | 11/2006 ............... H04N 7/26 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 D0 | 12/2011 |
| IL | 222829 D0 | 12/2012 |
| IL | 222830 D0 | 12/2012 |
| IL | 225525 D0 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 8-265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-156996 | 6/2005 |
| JP | 2005-519382 | 6/2005 |
| JP | 2005-523479 A | 8/2005 |
| JP | 2005-309752 | 11/2005 |
| JP | 2006-067280 | 3/2006 |
| JP | 2006-512838 | 4/2006 |
| JP | 11-88419 | 9/2007 |
| JP | 2008-523880 | 7/2008 |
| JP | 2008-535622 A | 9/2008 |
| JP | 04252727 B2 | 4/2009 |
| JP | 2009-543386 A | 12/2009 |
| JP | 2011-108155 A | 6/2011 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |

(56) References Cited

FOREIGN PATENT DOCUMENTS

| | | |
|---|---|---|
| JP | 05405819 B2 | 2/2014 |
| KR | 2006067924 A | 6/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 8202303 A1 | 7/1982 |
| WO | WO 8908967 A1 | 9/1989 |
| WO | WO 90/13972 A1 | 11/1990 |
| WO | WO 93/22877 A2 | 11/1993 | ............ H04N 7/173 |
| WO | WO 9416534 A2 | 7/1994 |
| WO | WO 9419910 A1 | 9/1994 |
| WO | WO 9421079 A1 | 9/1994 |
| WO | WO 95/15658 A2 | 6/1995 |
| WO | WO 9532587 A1 | 11/1995 |
| WO | WO 95/33342 A1 | 12/1995 |
| WO | WO 9533342 A1 | 12/1995 |
| WO | WO 9614712 A1 | 5/1996 |
| WO | WO 9627843 A1 | 9/1996 |
| WO | WO 9631826 A1 | 10/1996 |
| WO | WO 96/37074 A2 | 11/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/00735 A1 | 1/1999 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 99/66732 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 | ............ H04N 7/16 |
| WO | WO 02/076099 A1 | 9/2002 |
| WO | WO 03/026232 A1 | 3/2003 |
| WO | WO 2003/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO 2004/073310 A1 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO 2005/120067 A2 | 12/2005 |
| WO | WO 2006/014362 A1 | 2/2006 |
| WO | WO 2006/022881 A1 | 3/2006 |
| WO | WO 2006/053305 A2 | 5/2006 | ............ H04N 7/173 |
| WO | WO 2006/067697 A2 | 6/2006 |
| WO | WO 2006/081634 A2 | 8/2006 |
| WO | WO 2006/105480 A1 | 10/2006 | ............ H04N 5/445 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 | ............ H04N 7/173 |
| WO | WO 2007/018722 A3 | 2/2007 | ............ H04N 7/173 |
| WO | WO 2007/018726 A2 | 2/2007 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |

OTHER PUBLICATIONS

Authorized Officer Jürgen Güttlich, International Search Report and Written Opinion, dated Jan. 12, 2007, PCT/US2008/000450.

Hoarty, W. L., "The Smart Headend—A Novel Approach to Interactive Television", Montreux Int'l TV Symposium, Jun. 9, 1995.

Robert Koenen, "MPEG-4 Overview—Overview of the MPEG-4 Standard" Internet Citation, Mar. 2001.

Avaro, O., et al., "MPEG-4 Systems: Overview" Signal Processing, Image Communication, Elsevier Science Publishers, vol. 15, Jan. 1, 2000, pp. 281-298.

Stoll, G. et al., "GMF4iTV: Neue Wege zur Interaktivität mit bewegten Objekten beim digitalen Fernsehen" FKT Fernseh Und Kinotechnik, Fachverlag Schiele & Schon Gmgh., vol. 60, No. 4, Jan. 1, 2006, pp. 171-178.

AC-3 digital audio compression standard, Extract, Dec. 20, 1995, 11 pgs.

ActiveVideo Networks Bv, International Search Report and Written Opinion, PCT/NL2011/050308, Sep. 6, 2011, 8 pgs.

ActiveVideo Networks Inc., International Preliminary Report on Patentability, PCT/US2011/056355, Apr. 16, 2013, 4 pgs.

ActiveVideo Networks Inc., International Preliminary Report on Patentability, PCT/US2012/032010, Oct. 17, 2013, 4 pgs.

ActiveVideo Networks Inc., International Search Report and Written Opinion, PCT/US2011/056355, Apr. 13, 2012, 6 pgs.

ActiveVideo Networks Inc., International Search Report and Written Opinion, PCT/US2012/032010, Oct. 10, 2012, 6 pgs.

(56) References Cited

OTHER PUBLICATIONS

ActiveVideo Networks Inc., International Search Report and Written Opinion, PCT/US2013/020769, May 9, 2013, 9 pgs.
ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
ActiveVideo Networks Inc., Extended EP Search Rpt, Application No. 09820936-4, 11 pgs.
ActiveVideo Networks Inc., Extended EP Search Rpt, Application No. 10754084-1, 11 pgs.
ActiveVideo Networks Inc., Extended EP Search Rpt, Application No. 10841764.3, 16 pgs.
ActiveVideo Networks Inc., Extended EP Search Rpt, Application No. 11833486.1, 6 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Askenas, M., U.S. Appl. No. 10/253,109 (unpublished), filed Sep. 24, 2002. Not Found.
Avinity Systems B.V., Extended European Search Report, Application No. 12163713.6, 10 pgs.
Benjelloun, a summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, filed Dec. 23, 2010, 8 pgs.
Craig, Notice of Allowance, U.S. Appl. No. 11/178,183, filed Jan. 12, 2012, 7 pgs.
Craig, Notice of Allowance, U.S. Appl. No. 11/178,183, filed Jul. 19, 2012, 8 pgs.
Craig, Notice of Allowance, U.S. Appl. No. 11/178,189, filed Oct. 12, 2011, 7 pgs.
Craig, Notice of Allowance, U.S. Appl. No. 11/178,176, filed Mar. 23, 2011, 8 pgs.
Craig, Notice of Allowance, U.S. Appl. No. 13/609,183, filed Aug. 26, 2013, 8 pgs.
Craig, Final Office Action, U.S. Appl. No. 11/103,838, filed Feb. 5, 2009, 30 pgs.
Craig, Final Office Action, U.S. Appl. No. 11/103,838, filed Jul. 6, 2010, 35 pgs.
Craig, Final Office Action, U.S. Appl. No. 11/178,176, filed Oct. 1, 2010, 8 pgs.
Craig, Final Office Action, U.S. Appl. No. 11/178,183, filed Apr. 13, 2011, 16 pgs.
Craig, Final Office Action, U.S. Appl. No. 11/178,177, filed Oct. 26, 2010, 12 pgs.
Craig, Office Action, U.S. Appl. No. 11/103,838, filed May 12, 2009, 32 pgs.
Craig, Office Action, U.S. Appl. No. 11/103,838, filed Aug. 19, 2008, 17 pgs.
Craig, Office Action, U.S. Appl. No. 11/103,838, filed Nov. 19, 2009, 34 pgs.
Craig, Office Action, U.S. Appl. No. 11/178,176, filed May 6, 2010, 7 pgs.
Craig, Office-Action U.S. Appl. No. 11/178,177, filed Mar. 29, 2011, 15 pgs.
Craig, Office Action, U.S. Appl. No. 11/178,177, filed Aug. 3, 2011, 26 pgs.
Craig, Office Action, U.S. Appl. No. 11/178,177, filed Mar. 29, 2010, 11 pgs.
Craig, Office Action, U.S. Appl. No. 11/178,181, filed Feb. 11, 2011, 19 pgs.
Craig, Office Action, U.S. Appl. No. 11/178,181, filed Jun. 20, 2011, 21 pgs.
Craig, Office Action, U.S. Appl. No. 11/178,181, filed Aug. 25, 2010, 17 pgs.
Craig, Office Action, U.S. Appl. No. 11/178,181, filed Mar. 29, 2010, 10 pgs.
Craig, Office Action, U.S. Appl. No. 11/178,182, filed Feb. 23, 2010, 15 pgs.
Craig, Office Action, U.S. Appl. No. 11/178,183, filed Dec. 6, 2010, 12 pgs.
Craig, Office Action, U.S. Appl. No. 11/178,183, filed Sep. 15, 2011, 12 pgs.
Craig, Office Action, U.S. Appl. No. 11/178,183, filed Feb. 19, 2010, 17 pgs.
Craig, Office Action, U.S. Appl. No. 11/178,183, filed Jul. 20, 2010, 13 pgs.
Craig, Office Action, U.S. Appl. No. 11/178,189, filed Nov. 9, 2010, 13 pgs.
Craig, Office Action, U.S. Appl. No. 11/178,189, filed Mar. 15, 2010, 11 pgs.
Craig, Office Action, U.S. Appl. No. 11/178,189, filed Jul. 23, 2009, 10 pgs.
Craig, Office Action, U.S. Appl. No. 11/178,189, filed May 26, 2011, 14 pgs.
Craig, Office Action, U.S. Appl. No. 13/609,183, filed May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.orq, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, filed May 23, 2012, 5 pgs.
Herr, Notice of Allowance, U.S. Appl. No. 12/534,016, filed Feb. 7, 2012, 5 pgs.
Herr, Notice of Allowance, U.S. Appl. No. 12/534,016, filed Sep. 28, 2011, 15 pgs.
Herr, Final Office Action, U.S. Appl. No. 11/620,593, filed Sep. 15, 2011, 104 pgs.
Herr, Office Action, U.S. Appl. No. 11/620,593, filed Mar. 19, 2010, 58 pgs.
Herr, Office Action, U.S. Appl. No. 11/620,593, filed Apr. 21, 2009 27 pgs.
Herr, Office Action, U.S. Appl. No. 11/620,593, filed Dec. 23, 2009, 58 pgs.
Herr, Office Action, U.S. Appl. No. 11/620,593, filed Jan. 24, 2011, 96 pgs.
Herr, Office Action, U.S. Appl. No. 11/620,593, filed Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, Jan. 29, 2008, 9 pgs.
ICTV, Inc., International Search Report / Written Opinion, PCT/US2006/022585, Oct. 12, 2007, 15 pgs.
ICTV, Inc., International Search Report / Written Opinion, PCT/US2008/000419, May 15, 2009, 20 pgs.
ICTV, Inc., International Search Report / Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
Korean Intellectual Property Office, International Search Report; PCT/US2009/032457, Jul. 22, 2009, 7 pgs.
MPEG-2 Video elementary stream supplemental information, Dec. 1999, 12 pgs.
Ozer, Video Compositing 101. available from http://www.emedialive.com, Jun. 2, 2004, 5pgs.

(56) References Cited

OTHER PUBLICATIONS

Porter, Compositing Digital Images, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 1, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.
TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, in 1744/MUMNP/2007, Dec. 30, 2013, 6 pgs.
TVHEAD, Inc., International Search Report, PCT/US2006/010080, Jun. 20, 2006, 3 pgs.
TVHEAD, Inc., International Search Report, PCT/US2006/024194, Dec. 15, 2006, 4 pgs.
TVHEAD, Inc., International Search Report, PCT/US2006/024195, Nov. 29, 2006, 9 pgs.
TVHEAD, Inc., International Search Report, PCT/US2006/024196, Dec. 11, 2006, 4 pgs.
TVHEAD, Inc., International Search Report, PCT/US2006/024197, Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks Inc., Communication Pursuant to Rules 70(2) and 70a(2), EP11833486.1, Apr. 24, 2014, 1 pg.
ActiveVideo Networks, Inc., International Search Report and Written Opinion, PCT/US2014/041430, Oct. 9, 2014, 9 pgs.
ActiveVideo Networks Inc., Examination Report No. 1, AU2011258972, Jul. 21, 2014, 3 pgs.
Active Video Networks, Notice of Reasons for Rejection, JP2012-547318, Sep. 26, 2014, 7 pgs.
Avinity Systems B. V., Final Office Action, JP-2009-530298, Oct. 7, 2014, 8 pgs.
Brockmann, Final Office Action, U.S. Appl. No. 13/686,548, filed Sep. 24, 2014, 13 pgs.
Brockmann, Final Office Action, U.S. Appl. No. 13/438,617, filed Oct. 3, 2014, 19 pgs.
Brockmann, Office Action, U.S. Appl. No. 12/443,571, filed Nov. 5, 2014, 26 pgs.
ActiveVideo, http://www.activevideo.com/, as printed out in year 2012, 1 pg.
ActiveVideo Networks Inc., International Preliminary Report on Patentability, PCT/US2013/020769, Jul. 24, 2014, 6 pgs.
ActiveVideo Networks Inc., International Search Report and Written Opinion, PCT/US2014/030773, Jul. 25, 2014, 8 pgs.
ActiveVideo Networks Inc., International Search Report and Written Opinion, PCT/US2014/041416, Aug. 27, 2014, 8 pgs.
ActiveVideo Networks Inc., Extended EP Search Rpt, Application No. 13168509.1, 10 pgs.
ActiveVideo Networks Inc., Extended EP Search Rpt, Application No. 13168376-5, 8 pgs.
ActiveVideo Networks Inc., Extended EP Search Rpt, Application No. 12767642-7, 12 pgs.
ActiveVideo Networks Inc., Communication Pursuant to Rules 70(2) and 70a(2), EP10841764.3, Jun. 22, 2011, 1 pg.
ActiveVideo Networks Inc., Communication Pursuant to Article 94(3) EPC, EP08713106.6, Jun. 26, 2014, 5 pgS.
ActiveVideo Networks Inc., Communication Pursuant to Article 94(3) EPC, EP09713486.0, Apr. 14, 2014, 6 pgS.
ActiveVideo Networks Inc., Examination Report No. 1, AU2011258972, Apr. 4, 2013, 5 pgs.
ActiveVideo Networks Inc., Examination Report No. 1, AU2010339376, Apr. 30, 2014, 4 pgs.
ActiveVideo Networks Inc., Examination Report, App. No. EP11749946.7, Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report—International application No. PCT/US2010/027724, dated Oct. 28, 2010, together with the Written Opinion of the International Searching Authority, 7 pages.
Adams, Jerry, NTZ Nachrichtentechnische Zeitschrift. vol. 40, No. 7, Jul. 1987, Berlin DE pp. 534-536; Jerry Adams: 'Glasfasernetz für Breitbanddienste in London', 5 pgs. No English Translation Found.
Avinity Systems B.V., Communication pursuant to Article 94(3) EPC, EP 07834561.8, Jan. 31, 2014, 10 pgs.
Avinity Systems B.V., Extended European Search Report, Application No. 12163712-8, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Feb. 19, 2009, 7 pgs.

(56) References Cited

OTHER PUBLICATIONS

Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection for Patent, JP 2009-530298, Sep. 25, 2012, 6 pgs.
Bird et al., "Customer Access to Broadband Services," ISSLS 86—The International Symposium on Subrscriber Loops and Services Sep. 29, 1986, Tokyo,JP 6 pgs.
Brockmann, Final Office Action, U.S. Appl. No. 13/668,004, filed Jul. 16, 2014, 20 pgs.
Brockmann, Office Action, U.S. Appl. No. 13/686,548, filed Mar. 10, 2014, 11 pgs.
Brockmann, Office Action, U.S. Appl. No. 13/668,004, filed Dec. 23, 2013, 9 pgs.
Brockmann, Office Action, U.S. Appl. No. 13/438,617, filed May 12, 2014, 17 pgs.
Brockmann, Final Office Action, U.S. Appl. No. 12/443,571, filed Mar. 7, 2014, 21 pgs.
Brockmann, Office Action, U.S. Appl. No. 12/443,571, filed Jun. 5, 2013, 18 pgs.
Chang, Shih-Fu, et al., "Manipulation and Compositing of MC-DOT Compressed Video, " IEEE Journal on Selected Areas of Communications, Jan. 1995, vol. 13, No. 1, 11 pgs. Best Copy Available.
Dahlby, Office Action, U.S. Appl. No. 12/651,203, filed Jun. 5, 2014, 18 pgs.
Dahlby, Final Office Action, U.S. Appl. No. 12/651,203, filed Feb. 4, 2013, 18 pgs.
Dahlby, Office Action, U.S. Appl. No. 12/651,203, filed Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution—Metropolitan CATV Networks, " Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobi, et al., "ARIDEM—a multi-service broadband access demonstrator," Ericsson Review No. 3, 1996, 7 pgs.
Gordon, Notice of Allowance, U.S. Appl. No. 12/008,697, filed Mar. 20, 2014, 10 pgs.
Gordon, Final Office Action, U.S. Appl. No. 12/008,722, filed Mar. 30, 2012, 16 pgs.
Gordon, Final Office Action, U.S. Appl. No. 12/035,236, filed Jun. 11, 2014, 14 pgs.
Gordon, Final Office Action, U.S. Appl. No. 12/035,236, filed Jul. 22, 2013, 7 pgs.
Gordon, Final Office Action, U.S. Appl. No. 12/035,236, filed Sep. 20, 2011, 8 pgs.
Gordon, Final Office Action, U.S. Appl. No. 12/035,236, filed Sep. 21, 2012, 9 pgs.
Gordon, Final Office Action, U.S. Appl. No. 12/008,697, filed Mar. 6, 2012, 48 pgs.
Gordon, Office Action, U.S. Appl. No. 12/035,236, filed Mar. 13, 2013, 9 pgs.
Gordon, Office Action, U.S. Appl. No. 12/035,236, filed Mar. 22, 2011, 8 pgs.
Gordon, Office Action, U.S. Appl. No. 12/035,236, filed Mar. 28, 2012, 8 pgs.
Gordon, Office Action, U.S. Appl. No. 12/035,236, filed Dec. 16, 2013, 11 pgs.
Gordon, Office Action, U.S. Appl. No. 12/008,697, filed Aug. 1, 2013, 43 pgs.
Gordon, Office Action, U.S. Appl. No. 12/008,697, filed Aug. 4, 2011, 39 pgs.
Gordon, Office Action, U.S. Appl. No. 12/008,722, filed Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.
Insight advertisement, "In two years this is going to be the most watched program on TV" On touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report/Written Opinion, PCT/US2008/000400, Jul. 14, 2009, 10 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001, http://mpeg.telecomitalialab.com/standards/mpeg-4/mpeg-4.htm May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, Integrating Entertainment and Voice on the Cable Network by Earl Langenberg 0 TeleWest International and Ed Callahan—ANTEC. work on this one.
Large, D., "Tapped Fiber vs. Fiber-Reinforced Coaxial CATV Systems", IEEE LCS Magazine, Feb. 1990, 7 pgs. Best Copy Available.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29NVG11 Coding of Moving Pictures and Autdio, N1246, MPEG96/Mar. 1996, 101 pgs.
Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, filed Sep. 2, 2014, 8 pgs.
Regis, Notice of Allowance U.S. Appl. No. 13/273,803, filed May 14, 2014, 8 pgs.
Regis, Final Office Action U.S. Appl. No. 13/273,803, filed Oct. 11, 2013, 23 pgs.
Regis, Office Action U.S. Appl. No. 13/273,803, filed Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, filed Sep. 22, 2014, 5 pgs.
Sigmon, Notice of Allowance, U.S. Appl. No. 13/311,203, filed Feb. 27, 2014, 14 pgs.
Sigmon, Final Office Action, U.S. Appl. No. 13/311,203, filed Sep. 13, 2013, 20 pgs.
Sigmon, Office Action, U.S. Appl. No. 13/311,203, filed May 10, 2013, 21 pgs.

(56) References Cited

OTHER PUBLICATIONS

Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998, 4 pgs.
Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," GNOSTECH Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, Vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
ActiveVideo Networks, Inc., International Preliminary Report on Patentablity, PCT/US2013/036182, Oct. 14, 2014, 9 pgs.
ActiveVideo Networks Inc., Communication Pursuant to Rule 94(3), EP08713106-6, Jun. 25, 2014, 5 pgs.
ActiveVideo Networks Inc., Communication Pursuant to Rule 94(3), EP09713486.0, Apr. 14, 2014, 6 pgs.
ActiveVideo Networks Inc., Communication Pursuant to Rules 161(2) & 162 EPC, EP13775121.0, Jan. 20, 2015, 3 pgs.
ActiveVideo Networks Inc., Certificate of Patent JP5675765, Jan. 9, 2015, 3 pgs.
Brockmann, Notice of Allowance, U.S. Appl. No. 13/445,104, filed Dec. 24, 2014, 14 pgs.
Brockmann, Office Action, U.S. Appl. No. 13/668,004, filed Feb. 26, 2015, 17 pgs.
Brockmann, Office Action, U.S. Appl. No. 13/686,548, filed Jan. 5, 2015, 12 pgs.
Brockmann, Office Action, U.S. Appl. No. 13/911,948, filed Dec. 26, 2014, 12 pgs.
Brockmann, Office Action, U.S. Appl. No. 13/911,948, filed Jan. 29, 2015, 11 pgs.
Dahlby, Office Action, U.S. Appl. No. 12/651,203, filed Dec. 3, 2014, 19 pgs.
Gordon, Office Action, U.S. Appl. No. 12/008,722, filed Nov. 28, 2014, 18 pgs.
Regis, Notice of Allowance, U.S. Appl. No. 13/273,803, filed Nov. 18, 2014, 9 pgs.
Regis, Notice of Allowance, U.S. Appl. No. 13/273,803, filed Mar. 2, 2015, 8 pgs.
Sigmon, Notice of Allowance, U.S. Appl. No. 13/311,203, filed Dec. 19, 2014, 5 pgs.
TAG Networks Inc, Decision to Grant a Patent, JP 2008-506474, Oct. 4, 2013, 5 pg.
ActiveVideo Networks Inc., Decision to refuse a European patent application (Art. 97(2) EPC, EP09820936.4, Feb. 20, 2015, 4 pgs.
ActiveVideo Networks Inc., Communication Pursuant to Article 94(3) EPC, 10754084.1, Feb. 10, 2015, 12 pgs.
ActiveVideo Networks Inc., Communication under Rule 71(3) EPC, Intention to Grant, EP08713106.6, Feb. 19, 2015, 12 pgs.
ActiveVideo Networks Inc., Notice of Reasons for Rejection, JP2014-100460, Jan. 15, 2015, 6 pgs.
ActiveVideo Networks Inc., Notice of Reasons for Rejection, JP2013-509016, Dec. 24, 2014 (Received Jan. 14, 2015), 11 pgs.
Brockmann, Office Action, U.S. Appl. No. 13/737,097, filed Mar. 16, 2015, 18 pgs.
Brockmann, Notice of Allowance, U.S. Appl. No. 14/298,796, filed Mar. 18, 2015, 11 pgs.
Craig, Decision on Appeal—Reversed—, U.S. Appl. No. 11/178,177, filed Feb. 25, 2015, 7 pgs.
Craig, Notice of Allowance, U.S. Appl. No. 11/178,177, filed Mar. 5, 2015, 7 pgs.
Craig, Notice of Allowance, U.S. Appl. No. 11/178,181, filed Feb. 13, 2015, 8 pgs.

* cited by examiner

```xml
<?xml version="1.0" encoding="UTF-8" standalone="no" ?>
<AVML name="ActiveVideoApp" type="unicast" version="1.0">

<InitialScene>Scene1</InitialScene>

<Stream>
    <Size height="480" width="640"/>
    <AspectRatio>4:3</AspectRatio>
    <VideoFormat>NTSC</VideoFormat>
  </Stream>

<DataCarousel>
    <Format>DCII</Format>
    <Url>http://someserver/somepath/somefile.html</Url>
    <BitRate>0</BitRate>
  </DataCarousel>

<Scene name="Scene1">
    <InitialFocus>None</InitialFocus>
    <Background>
      <Url>/Resources/comcast/home/bg.bmp</Url>
      <Refresh>
        <Type>slice</Type>
        <Count>2</Count>
      </Refresh>
    </Background>
    <MediaPlayer name="MultiMedia">
      <Pos x="480" y="224"/>
      <Size height="80" width="112"/>
      <Url>/Resources/comcast/home/HP1_01.ts</Url>
      <Chaser>
        <ImageUrl>/Resources/comcast/7x5chaser.bmp</ImageUrl>
        <Focusable>1</Focusable>
        <Up>TextInput</Up>
        <Down>Image</Down>
        <Left>ListBox</Left>
        <Right>None</Right>
      </Chaser>
    </MediaPlayer>
    <Ticker name="Ticker">
      <Text>Ticker Text</Text>
      <Pos x="272" y="400"/>
      <Size height="32" width="336"/>
      <TextAttributes>
        <FontName>Arial</FontName>
        <FontSize>15</FontSize>
        <FontWeight>400</FontWeight>
        <FontItalic>0</FontItalic>
        <Justification>38</Justification>
        <TextColor>000000</TextColor>
      </TextAttributes>
```

*FIG. 1B.1*

```xml
    <BackgroundColor>FFFFFF</BackgroundColor>
    <AlphaBlending>255</AlphaBlending>
</Ticker>
<Button name="Button">
    <InitialState>Default</InitialState>
    <Pos x="480" y="352"/>
    <Size height="32" width="128"/>
    <Text>Button</Text>
    <ButtonState type="Clicked">
        <TextAttributes>
            <FontName>Arial</FontName>
            <FontSize>15</FontSize>
            <FontWeight>0</FontWeight>
            <FontItalic>0</FontItalic>
            <TextColor>000000</TextColor>
            <Justification>37</Justification>
        </TextAttributes>
        <BackgroundColor>C0C0C0</BackgroundColor>
    </ButtonState>
    <ButtonState type="Selected">
        <TextAttributes>
            <FontName>Arial</FontName>
            <FontSize>15</FontSize>
            <FontWeight>0</FontWeight>
            <FontItalic>0</FontItalic>
            <TextColor>000000</TextColor>
            <Justification>37</Justification>
        </TextAttributes>
        <BackgroundColor>C0C0C0</BackgroundColor>
    </ButtonState>
    <ButtonState type="Focused">
        <TextAttributes>
            <FontName>Arial</FontName>
            <FontSize>15</FontSize>
            <FontWeight>0</FontWeight>
            <FontItalic>0</FontItalic>
            <TextColor>000000</TextColor>
            <Justification>37</Justification>
        </TextAttributes>
        <BackgroundColor>C0C0C0</BackgroundColor>
    </ButtonState>
    <ButtonState type="Default">
        <Url>/Resources/mosaic/button_off.bmp</Url>
        <TextAttributes>
            <FontName>Arial</FontName>
            <FontSize>15</FontSize>
            <FontWeight>0</FontWeight>
            <FontItalic>0</FontItalic>
            <TextColor>000000</TextColor>
            <Justification>37</Justification>
        </TextAttributes>
```

*FIG. 1B.2*

```xml
      <BackgroundColor>C0C0C0</BackgroundColor>
    </ButtonState>
    <ButtonState type="Disabled">
      <TextAttributes>
        <FontName>Arial</FontName>
        <FontSize>15</FontSize>
        <FontWeight>0</FontWeight>
        <FontItalic>0</FontItalic>
        <TextColor>000000</TextColor>
        <Justification>37</Justification>
      </TextAttributes>
      <BackgroundColor>C0C0C0</BackgroundColor>
    </ButtonState>
    <AlphaBlending>255</AlphaBlending>
    <Chaser>
      <Focusable>1</Focusable>
      <Up>Image</Up>
      <Down>None</Down>
      <Left>None</Left>
      <Right>None</Right>
    </Chaser>
  </Button>
  <StaticImage name="Image">
    <Url>/Resources/mosaic/testdrive.bmp</Url>
    <Pos x="336" y="320"/>
    <Size height="32" width="128"/>
    <AlphaBlending>255</AlphaBlending>
    <Chaser>
      <ImageUrl>/Resources/comcast/6x5chaser.bmp</ImageUrl>
      <Focusable>1</Focusable>
      <Up>MultiMedia</Up>
      <Down>Button</Down>
      <Left>None</Left>
      <Right>None</Right>
    </Chaser>
  </StaticImage>
  <ListBox name="ListBox">
    <Pos x="80" y="240"/>
    <Size height="32" width="336"/>
    <VisibleItemNum>3</VisibleItemNum>
    <AlphaBlending>255</AlphaBlending>
    <Horizontal>1</Horizontal>
    <ButtonState type="Clicked">
      <TextAttributes>
        <FontName>Arial</FontName>
        <FontSize>15</FontSize>
        <FontWeight>400</FontWeight>
        <FontItalic>0</FontItalic>
        <TextColor>000000</TextColor>
        <Justification>37</Justification>
      </TextAttributes>
```

*FIG. 1B.3*

```xml
      <BackgroundColor>C0C0C0</BackgroundColor>
    </ButtonState>
    <ButtonState type="Selected">
      <TextAttributes>
        <FontName>Arial</FontName>
        <FontSize>15</FontSize>
        <FontWeight>400</FontWeight>
        <FontItalic>0</FontItalic>
        <TextColor>000000</TextColor>
        <Justification>37</Justification>
      </TextAttributes>
      <BackgroundColor>C0C0C0</BackgroundColor>
    </ButtonState>
    <ButtonState type="Focused">
      <TextAttributes>
        <FontName>Arial</FontName>
        <FontSize>15</FontSize>
        <FontWeight>400</FontWeight>
        <FontItalic>0</FontItalic>
        <TextColor>000000</TextColor>
        <Justification>37</Justification>
      </TextAttributes>
      <BackgroundColor>C0C0C0</BackgroundColor>
    </ButtonState>
    <ButtonState type="Default">
      <TextAttributes>
        <FontName>Arial</FontName>
        <FontSize>15</FontSize>
        <FontWeight>400</FontWeight>
        <FontItalic>0</FontItalic>
        <TextColor>000000</TextColor>
        <Justification>37</Justification>
      </TextAttributes>
      <BackgroundColor>C0C0C0</BackgroundColor>
    </ButtonState>
    <ButtonState type="Disabled">
      <TextAttributes>
        <FontName>Arial</FontName>
        <FontSize>15</FontSize>
        <FontWeight>400</FontWeight>
        <FontItalic>0</FontItalic>
        <TextColor>000000</TextColor>
        <Justification>37</Justification>
      </TextAttributes>
      <BackgroundColor>C0C0C0</BackgroundColor>
    </ButtonState>
    <Chaser>
      <Focusable>1</Focusable>
      <Up>MultiMedia</Up>
      <Down>Image</Down>
      <Left>None</Left>
```

*FIG. 1B.4*

```xml
      <Right>MultiMedia</Right>
    </Chaser>
    <ListItem>
      <ButtonState type="Clicked"/>
      <ButtonState type="Selected"/>
      <ButtonState type="Focused"/>
      <ButtonState type="Default"/>
      <ButtonState type="Disabled"/>
      <InitialState>Default</InitialState>
      <Text>Button0</Text>
    </ListItem>
    <ListItem>
      <ButtonState type="Clicked"/>
      <ButtonState type="Selected"/>
      <ButtonState type="Focused"/>
      <ButtonState type="Default">
        <Url>/Resources/comcast/golf1/but2off.png</Url>
      </ButtonState>
      <ButtonState type="Disabled"/>
      <InitialState>Default</InitialState>
      <Text>Button1</Text>
    </ListItem>
    <ListItem>
      <ButtonState type="Clicked"/>
      <ButtonState type="Selected"/>
      <ButtonState type="Focused"/>
      <ButtonState type="Default"/>
      <ButtonState type="Disabled"/>
      <InitialState>Default</InitialState>
      <Text>Button2</Text>
    </ListItem>
  </ListBox>
  <Caption name="Caption">
    <Text>Text</Text>
    <Pos x="32" y="336"/>
    <Size height="48" width="288"/>
    <TextAttributes>
      <FontName>Arial</FontName>
      <FontSize>15</FontSize>
      <FontWeight>400</FontWeight>
      <FontItalic>0</FontItalic>
      <Justification>0</Justification>
      <TextColor>000000</TextColor>
    </TextAttributes>
    <BackgroundColor>FFFFFF</BackgroundColor>
    <AlphaBlending>255</AlphaBlending>
  </Caption>
  <InputBox name="TextInput">
    <Text>TextInput</Text>
    <Pos x="144" y="112"/>
    <Size height="48" width="368"/
```

*FIG. 1B.5*

```xml
<TextAttributes>
    <FontName>Arial</FontName>
    <FontSize>15</FontSize>
    <FontWeight>400</FontWeight>
    <FontItalic>0</FontItalic>
    <Justification>36</Justification>
    <TextColor>000000</TextColor>
</TextAttributes>
<BackgroundColor>FEFEFE</BackgroundColor>
<AlphaBlending>255</AlphaBlending>
<Chaser>
    <ImageUrl>/Resources/comcast/adwindowchaser2.bmp</ImageUrl>
    <Focusable>1</Focusable>
    <Up>None</Up>
    <Down>MultiMedia</Down>
    <Left>None</Left>
    <Right>None</Right>
</Chaser>
      </InputBox>
   </Scene>

<Script>

<!CDATAActiveVideoApp.Scene1.onInitialUpdate = function ()
{

}

ActiveVideoApp.Scene1.onKeyPress = function (key)
{

}

ActiveVideoApp.Scene1.onUnload = function ()
{

}

ActiveVideoApp.Scene1.onLoad = function ()
{

}>
   </Script>

</AVML>
```

*FIG. 1B.6*

INTERACTIVE ENCODED CONTENT SYSTEM INCLUDING OBJECT MODELS FOR VIEWING ON A REMOTE DEVICE

CROSS-REFERENCE TO RELATED APPLICATIONS

U.S. patent application No. 12/008,722 entitled "MPEG Objects and Systems and Methods for Using MPEG Objects" and assigned to the same assignee filed contemporaneously herewith on Jan. 11, 2008 is related generally to the subject matter of the present application and is incorporated herein by reference in its entirety.

The present application claims priority from U.S. provisional application Ser. No. 60/884,773, filed Jan. 12, 2007, Ser. No. 60/884,744, filed Jan. 12, 2007, and Ser. No. 60/884,772, filed Jan. 12, 2007, the full disclosures of which are hereby incorporated herein by reference.

TECHNICAL FIELD AND BACKGROUND ART

The present invention relates to systems and methods for providing interactive content to a remote device and more specifically to systems and methods wherein an object model is associated with pre-encoded video content.

In cable television systems, the cable head-end transmits content to one or more subscribers wherein the content is transmitted in an encoded form. Typically, the content is encoded as digital MPEG video and each subscriber has a set-top box or cable card that is capable of decoding the MPEG video stream. Beyond providing linear content, cable providers can now provide interactive content, such as web pages or walled-garden content. As the Internet has become more dynamic, including video content on web pages and requiring applications or scripts for decoding the video content, cable providers have adapted to allow subscribers the ability to view these dynamic web pages. In order to composite a dynamic web page for transmission to a requesting subscriber in encoded form, the cable head end retrieves the requested web page and renders the web page. Thus, the cable headend must first decode any encoded content that appears within the dynamic webpage. For example, if a video is to be played on the webpage, the headend must retrieve the encoded video and decode each frame of the video. The cable headend then renders each frame to form a sequence of bitmap images of the Internet web page. Thus, the web page can only be composited together if all of the content that forms the web page is first decoded. Once the composite frames are complete, the composited video is sent to an encoder, such as an MPEG encoder to be re-encoded. The compressed MPEG video frames are then sent in an MPEG video stream to the user's set-top box.

Creating such composite encoded video frames in a cable television network requires intensive CPU and memory processing, since all encoded content must first be decoded, then composited, rendered, and re-encoded. In particular, the cable headend must decode and re-encode all of the content in real-time. Thus, allowing users to operate in an interactive environment with dynamic web pages is quite costly to cable operators because of the required processing. Additionally, such systems have the additional drawback that the image quality is degraded due to re-encoding of the encoded video.

SUMMARY OF THE INVENTION

Embodiments of the invention disclose a system for encoding at least one composite encoded video frame for display on a display device. The system includes a markup language-based graphical layout, the graphical layout including frame locations within the composite frame for at least the first encoded source and the second encoded source. Additionally, the system has a stitcher module for stitching together the first encoded source and the second encoded source according to the frame locations of the graphical layout. The stitcher forms an encoded frame without having to decode the block-based transform encoded data for at least the first source. The encoded video may be encoded using one of the MPEG standards, AVS, VC-1 or another block-based encoding protocol.

In certain embodiments of the invention, the system allows a user to interact with graphical elements on a display device. The processor maintains state information about one or more graphical elements identified in the graphical layout. The graphical elements in the graphical layout are associated with one of the encoded sources. A user transmits a request to change state of one of the graphical elements through a client device in communication with the system. The request for the change in state causes the processor to register the change in state and to obtain a new encoded source. The processor causes the stitcher to stitch the new encoded source in place of the encoded source representing the graphic element. The processor may also execute or interpret computer code associated with the graphic element.

For example, the graphic element may be a button object that has a plurality of states, associated encoded content for each state, and methods associated which each of the states. The system may also include a transmitter for transmitting to the client device the composited video content. The client device can then decode the composited video content and cause the composited video content to be displayed on a display device. In certain embodiments each graphical element within the graphical layout is associated with one or more encoded MPEG video frames or portions of a video frame, such as one or more macroblocks or slices. The compositor may use a single graphical element repeatedly within the MPEG video stream. For example, the button may be only a single video frame in one state and a single video frame in another state and the button may be composited together with MPEG encoded video content wherein the encoded macroblocks representing the button are stitched into the MPEG encoded video content in each frame.

Other embodiments of the invention disclose a system for creating one or more composite MPEG video frames forming an MPEG video stream. The MPEG video stream is provided to a client device that includes an MPEG decoder. The client device decodes the MPEG video stream and outputs the video to a display device. The composite MPEG video frames are created by obtaining a graphical layout for a video frame. The graphical layout includes frame locations within the composite MPEG video frame for at least a first MPEG source and a second MPEG source. Based upon the graphical layout the first and second MPEG sources are obtained. The first and second MPEG sources are provided to a stitcher module. The stitcher module stitches together the first MPEG source and the second MPEG source according to the frame locations of the graphical layout to form an MPEG frame without having to decode the macroblock data of the MPEG sources. In certain embodiments, the MPEG sources are only decoded to the slice layer and a processor maintains the positions of the slices within the frame for the first and second MPEG sources. This process is repeated for each frame of MPEG data in order to form an MPEG video stream.

In certain embodiments, the system includes a groomer. The groomer grooms the MPEG sources so that each MPEG element of the MPEG source is converted to an MPEG P-frame format. The groomer module may also identify any macroblocks in the second MPEG source that include motion vectors that reference other macroblocks in a section of the first MPEG source and re-encodes those macroblocks as intracoded macroblocks.

The system may include an association between an MPEG source and a method for the MPEG source forming an MPEG object. In such a system, a processor would receive a request from a client device and in response to the request, a method of the MPEG object would be used. The method may change the state of the MPEG object and cause the selection of a different MPEG source. Thus, the stitcher may replace a first MPEG source with a third MPEG source and stitch together the third and second MPEG sources to form a video frame. The video frame would be streamed to the client device and the client device could decode the updated MPEG video frame and display the updated material on the client's display. For example, an MPEG button object may have an "on" state and an "off" state and the MPEG button object may also include two MPEG graphics composed of a plurality of macroblocks forming slices. In response to a client requesting to change the state of the button from off to on, a method would update the state and cause the MPEG encoded graphic representing an "on" button to be passed to the stitcher.

In certain embodiments, the video frame may be constructed from an unencoded graphic or a graphic that is not MPEG encoded and a groomed MPEG video source. The unencoded graphic may first be rendered. For example, a background may be rendered as a bit map. The background may then be encoded as a series of MPEG macroblocks divided up into slices. The stitcher can then stitch together the background and the groomed MPEG video content to form an MPEG video stream. The background may then be saved for later reuse. In such a configuration, the background would have cut-out regions wherein the slices in those regions would have no associated data, thus video content slices could be inserted into the cut-out. In other embodiments, real-time broadcasts may be received and groomed for creating MPEG video streams.

BRIEF DESCRIPTION OF THE DRAWINGS

The foregoing features of the invention will be more readily understood by reference to the following detailed description, taken with reference to the accompanying drawings, in which:

FIG. 1B is a sample composite stream presentation and interaction layout file;

DETAILED DESCRIPTION OF SPECIFIC EMBODIMENTS

Figure 1:
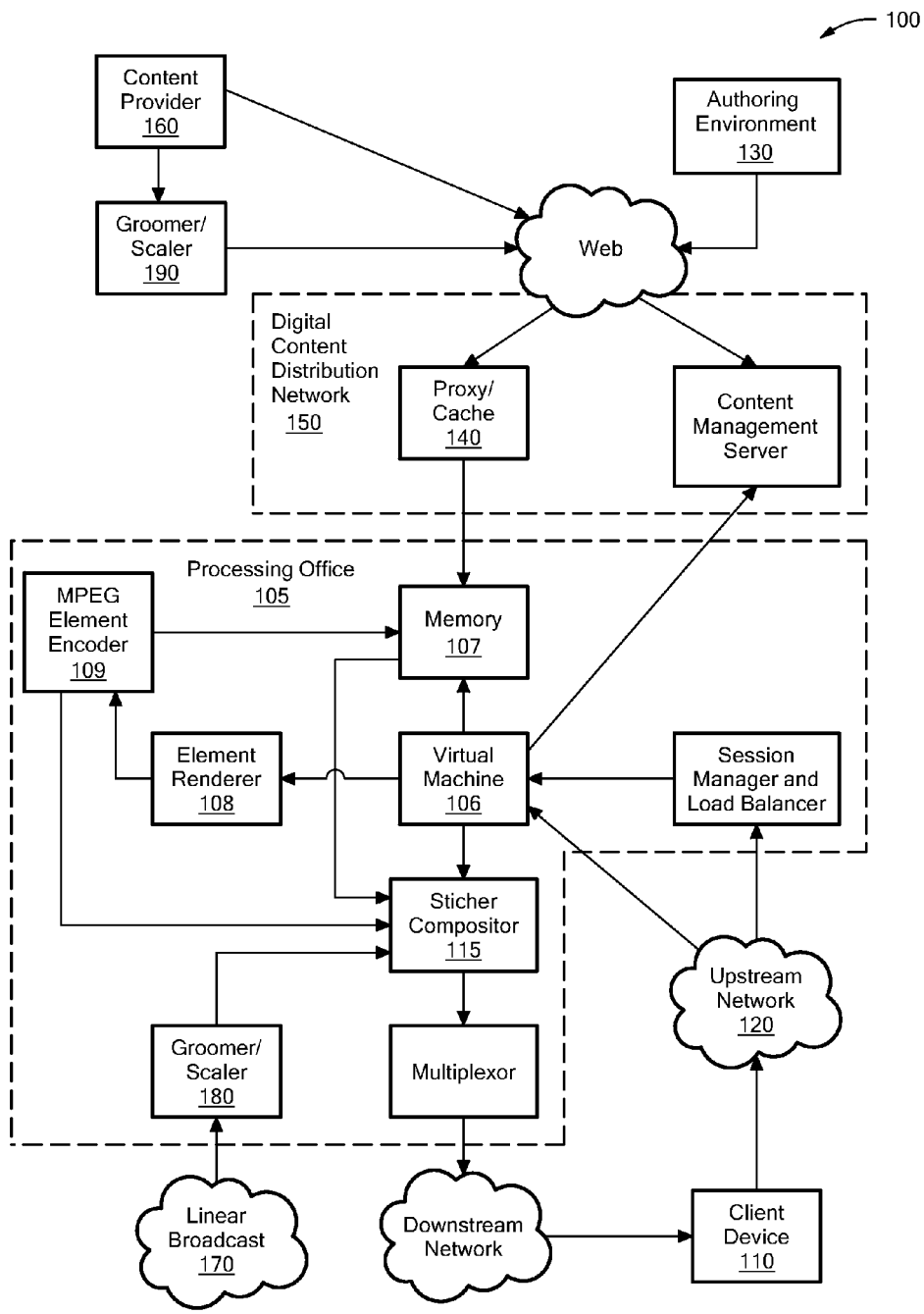
FIG. 1 is a block diagram showing a communications environment for implementing one version of the present invention.

As used in the following detailed description and in the appended claims the term "region" shall mean a logical grouping of MPEG (Motion Picture Expert Group) slices that are either contiguous or non-contiguous. When the term MPEG is used it shall refer to all variants of the MPEG standard including MPEG-2 and MPEG-4. The present invention as described in the embodiments below provides an environment for interactive MPEG content and communications between a processing office and a client device having an associated display, such as a television. Although the present invention specifically references the MPEG specification and encoding, principles of the invention may be employed with other encoding techniques that are based upon block-based transforms. As used in the following specification and appended claims, the terms encode, encoded, and encoding shall refer to the process of compressing a digital data signal and formatting the compressed digital data signal to a protocol or standard. Encoded video data can be in any state other than a spatial representation. For example, encoded video data may be transform coded, quantized, and entropy encoded or any combination thereof. Therefore, data that has been transform coded will be considered to be encoded.

Although the present application refers to the display device as a television, the display device may be a cell phone, a Personal Digital Assistant (PDA) or other device that includes a display. A client device including a decoding device, such as a set-top box that can decode MPEG content, is associated with the display device of the user. In certain embodiments, the decoder may be part of the display device. The interactive MPEG content is created in an authoring environment allowing an application designer to design the interactive MPEG content creating an application having one or more scenes from various elements including video content from content providers and linear broadcasters. An application file is formed in an Active Video Markup Language (AVML). The AVML file produced by the authoring environment is an XML-based file defining the video graphical elements (i.e. MPEG slices) within a single frame/page, the sizes of the video graphical elements, the layout of the video graphical elements within the page/frame for each scene, links to the video graphical elements, and any scripts for the scene. In certain embodiments, an AVML file may be authored directly as opposed to being authored in a text editor or generated by an authoring environment. The video graphical elements may be static graphics, dynamic graphics, or video content. It should be recognized that each element within a scene is really a sequence of images and a static graphic is an image that is repeatedly displayed and does not change over time. Each of the elements may be an MPEG object that can include both MPEG data for graphics and operations associated with the graphics. The interactive MPEG content can include multiple interactive MPEG objects within a scene with which a user can interact. For example, the scene may include a button MPEG object that provides encoded MPEG data forming the video graphic for the object and also includes a procedure for keeping track of the button state. The MPEG objects may work in coordination with the scripts. For example, an MPEG button object may keep track of its state (on/off), but a script within the scene will determine what occurs when that button is pressed. The script may associate the button state with a video program so that the button will indicate whether the video content is playing or stopped. MPEG objects always have an associated action as part of the object. In certain embodiments, the MPEG objects, such as a button MPEG object, may perform actions beyond keeping track of the status of the button. In such, embodiments, the MPEG object may also include a call to an external program, wherein the MPEG object will access the program when the button graphic is engaged. Thus, for a play/pause MPEG object button, the MPEG object may include code that keeps track of the state of the button, provides a graphical overlay based upon a state change, and/or causes a video player object to play or pause the video content depending on the state of the button.

Once an application is created within the authoring environment, and an interactive session is requested by a requesting client device, the processing office assigns a processor for the interactive session.

The assigned processor operational at the processing office runs a virtual machine and accesses and runs the requested application. The processor prepares the graphical part of the scene for transmission in the MPEG format. Upon receipt of the MPEG transmission by the client device and display on the user's display, a user can interact with the displayed content by using an input device in communication with the client device. The client device sends input requests from the user through a communication network to the application running on the assigned processor at the processing office or other remote location. In response, the assigned processor updates the graphical layout based upon the request and the state of the MPEG objects hereinafter referred to in total as the application state. New elements may be added to the scene or replaced within the scene or a completely new scene may be created. The assigned processor collects the elements and the objects for the scene, and either the assigned processor or another processor processes the data and operations according to the object(s) and produces the revised graphical representation in an MPEG format that is transmitted to the transceiver for display on the user's television. Although the above passage indicates that the assigned processor is located at the processing office, the assigned processor may be located at a remote location and need only be in communication with the processing office through a network connection. Similarly, although the assigned processor is described as handling all transactions with the client device, other processors may also be involved with requests and assembly of the content (MPEG objects) of the graphical layout for the application.

FIG. 1 is a block diagram showing a communications environment 100 for implementing one version of the present invention. The communications environment 100 allows an applications programmer to create an application for two-way interactivity with an end user. The end user views the application on a client device 110, such as a television, and can interact with the content by sending commands upstream through an upstream network 120 wherein upstream and downstream may be part of the same network or a separate network providing the return path link to the processing office. The application programmer creates an application that includes one or more scenes. Each scene is the equivalent of an HTML webpage except that each element within the scene is a video sequence. The application programmer designs the graphical representation of the scene and incorporates links to elements, such as audio and video files and objects, such as buttons and controls for the scene. The application programmer uses a graphical authoring environment 130 to graphically select the objects and elements. The authoring environment 130 may include a graphical interface that allows an application programmer to associate methods with elements creating video objects. The graphics may be MPEG encoded video, groomed MPEG video, still images or video in another format. The application programmer can incorporate content from a number of sources including content providers 160 (news sources, movie studios, RSS feeds etc.) and linear broadcast sources (broadcast media and cable, on demand video sources and web-based video sources) 170 into an application. The application programmer creates the application as a file in AVML (active video mark-up language) and sends the application file to a proxy/cache 140 within a video content distribution network 150. The AVML file format is an XML format. For example see FIG. 1B that shows a sample AVML file.

The content provider 160 may encode the video content as MPEG video/audio or the content may be in another graphical format (e.g. JPEG, BITMAP, H263, H264, VC-1 etc.). The content may be subsequently groomed and/or scaled in a Groomer/Scaler 190 to place the content into a preferable encoded MPEG format that will allow for stitching. If the content is not placed into the preferable MPEG format, the processing office will groom the format when an application that requires the content is requested by a client device. Linear broadcast content 170 from broadcast media services, like content from the content providers, will be groomed. The linear broadcast content is preferably groomed and/or scaled in Groomer/Scaler 180 that encodes the content in the preferable MPEG format for stitching prior to passing the content to the processing office.

The video content from the content producers 160 along with the applications created by application programmers are distributed through a video content distribution network 150 and are stored at distribution points 140. These distribution points are represented as the proxy/cache within FIG. 1. Content providers place their content for use with the interactive processing office in the video content distribution network at a proxy/cache 140 location. Thus, content providers 160 can provide their content to the cache 140 of the video content distribution network 150 and one or more processing office that implements the present architecture may access the content through the video content distribution network 150 when needed for an application. The video content distribution network 150 may be a local network, a regional network or a global network. Thus, when a virtual machine at a processing office requests an application, the application can be retrieved from one of the distribution points and the content as defined within the application's AVML file can be retrieved from the same or a different distribution point.

An end user of the system can request an interactive session by sending a command through the client device 110, such as a set-top box, to a processing office 105. In FIG. 1, only a single processing office is shown. However, in real-world applications, there may be a plurality of processing offices located in different regions, wherein each of the processing offices is in communication with a video content distribution network as shown in FIG. 1B. The processing office 105 assigns a processor for the end user for an interactive session. The processor maintains the session including all addressing and resource allocation. As used in the specification and the appended claims the term "virtual machine" 106 shall refer to the assigned processor, as well as, other processors at the processing office that perform functions, such as session management between the processing office and the client device as well as resource allocation (i.e. assignment of a processor for an interactive session).

The virtual machine 106 communicates its address to the client device 110 and an interactive session is established. The user can then request presentation of an interactive application (AVML) through the client device 110. The request is received by the virtual machine 106 and in response, the virtual machine 106 causes the AVML file to be retrieved from the proxy/cache 140 and installed into a memory cache 107 that is accessible by the virtual machine 106. It should be recognized that the virtual machine 106 may be in simultaneous communication with a plurality of client devices 110 and the client devices may be different device types. For example, a first device may be a cellular telephone, a second device may be a set-top box, and a third device may be a personal digital assistant wherein each device access the same or a different application.

In response to a request for an application, the virtual machine 106 processes the application and requests elements and MPEG objects that are part of the scene to be moved from the proxy/cache into memory 107 associated with the virtual machine 106. An MPEG object includes both a visual component and an actionable component. The visual component may be encoded as one or more MPEG slices or provided in another graphical format. The actionable component may be storing the state of the object, may include performing computations, accessing an associated program, or displaying overlay graphics to identify the graphical component as active. An overlay graphic may be produced by a signal being transmitted to a client device wherein the client device creates a graphic in the overlay plane on the display device. It should be recognized that a scene is not a static graphic, but rather includes a plurality of video frames wherein the content of the frames can change over time.

The virtual machine 106 determines based upon the scene information, including the application state, the size and location of the various elements and objects for a scene. Each graphical element may be formed from contiguous or non-contiguous MPEG slices. The virtual machine keeps track of the location of all of the slices for each graphical element. All of the slices that define a graphical element form a region. The virtual machine 106 keeps track of each region. Based on the display position information within the AVML file, the slice positions for the elements and background within a video frame are set. If the graphical elements are not already in a groomed format, the virtual machine passes that element to an element renderer. The renderer renders the graphical element as a bitmap and the renderer passes the bitmap to an MPEG element encoder 109. The MPEG element encoder encodes the bitmap as an MPEG video sequence. The MPEG encoder processes the bitmap so that it outputs a series of P-frames. An example of content that is not already pre-encoded and pre-groomed is personalized content. For example, if a user has stored music files at the processing office and the graphic element to be presented is a listing of the user's music files, this graphic would be created in real-time as a bitmap by the virtual machine. The virtual machine would pass the bitmap to the element renderer 108 which would render the bitmap and pass the bitmap to the MPEG element encoder 109 for grooming.

After the graphical elements are groomed by the MPEG element encoder, the MPEG element encoder 109 passes the graphical elements to memory 107 for later retrieval by the virtual machine 106 for other interactive sessions by other users. The MPEG encoder 109 also passes the MPEG encoded graphical elements to the stitcher 115. The rendering of an element and MPEG encoding of an element may be accomplished in the same or a separate processor from the virtual machine 106. The virtual machine 106 also determines if there are any scripts within the application that need to be interpreted. If there are scripts, the scripts are interpreted by the virtual machine 106.

Each scene in an application can include a plurality of elements including static graphics, object graphics that change based upon user interaction, and video content. For example, a scene may include a background (static graphic), along with a media player for playback of audio video and multimedia content (object graphic) having a plurality of buttons, and a video content window (video content) for displaying the streaming video content. Each button of the media player may itself be a separate object graphic that includes its own associated methods.

The virtual machine 106 acquires each of the graphical elements (background, media player graphic, and video frame) for a frame and determines the location of each element. Once all of the objects and elements (background, video content) are acquired, the elements and graphical objects are passed to the stitcher/compositor 115 along with positioning information for the elements and MPEG objects. The stitcher 115 stitches together each of the elements (video content, buttons, graphics, background) according to the mapping provided by the virtual machine 106. Each of the elements is placed on a macroblock boundary and when stitched together the elements form an MPEG video frame. On a periodic basis all of the elements of a scene frame are encoded to form a reference P-frame in order to refresh the sequence and avoid dropped macroblocks. The MPEG video stream is then transmitted to the address of client device through the down stream network. The process continues for each of the video frames. Although the specification refers to MPEG as the encoding process, other encoding processes may also be used with this system.

The virtual machine 106 or other processor or process at the processing office 105 maintains information about each of the elements and the location of the elements on the screen. The virtual machine 106 also has access to the methods for the objects associated with each of the elements. For example, a media player may have a media player object that includes a plurality of routines. The routines can include, play, stop, fast forward, rewind, and pause. Each of the routines includes code and upon a user sending a request to the processing office 105 for activation of one of the routines, the object is accessed and the routine is run. The routine may be a JAVA-based applet, a script to be interpreted, or a separate computer program capable of being run within the operating system associated with the virtual machine.

The processing office 105 may also create a linked data structure for determining the routine to execute or interpret based upon a signal received by the processor from the client device associated with the television. The linked data structure may be formed by an included mapping module. The data structure associates each resource and associated object relative to every other resource and object. For example, if a user has already engaged the play control, a media player object is activated and the video content is displayed. As the video content is playing in a media player window, the user can depress a directional key on the user's remote control. In this example, the depression of the directional key is indicative of pressing a stop button. The transceiver produces a directional signal and the assigned processor receives the directional signal. The virtual machine 106 or other processor at the processing office 105 accesses the linked data structure and locates the element in the direction of the directional key press. The database indicates that the element is a stop button that is part of a media player object and the processor implements the routine for stopping the video content. The routine will cause the requested content to stop. The last video content frame will be frozen and a depressed stop button graphic will be interwoven by the stitcher module into the frame. The routine may also include a focus graphic to provide focus around the stop button. For example, the virtual machine can cause the stitcher to enclose the graphic having focus with a boarder that is 1 macroblock wide. Thus, when the video frame is decoded and displayed, the user will be able to identify the graphic/object that the user can interact with. The frame will then be passed to a multiplexor and sent through the downstream network to the client device. The MPEG encoded video frame is decoded by the client device displayed on either the client device (cell phone, PDA) or on a separate display device (monitor, television). This process occurs with a minimal delay. Thus, each scene from an application results in a plurality of video frames each representing a snapshot of the media player application state.

The virtual machine 106 will repeatedly receive commands from the client device and in response to the commands will either directly or indirectly access the objects and execute or interpret the routines of the objects in response to user interaction and application interaction model. In such a system, the video content material displayed on the television of the user is merely decoded MPEG content and all of the processing for the interactivity occurs at the processing office and is orchestrated by the assigned virtual machine. Thus, the client device only needs a decoder and need not cache or process any of the content.

It should be recognized that through user requests from a client device, the processing office could replace a video element with another video element. For example, a user may select from a list of movies to display and therefore a first video content element would be replaced by a second video content element if the user selects to switch between two movies. The virtual machine, which maintains a listing of the location of each element and region forming an element can easily replace elements within a scene creating a new MPEG video frame wherein the frame is stitched together including the new element in the stitcher 115.

Figure 1A:
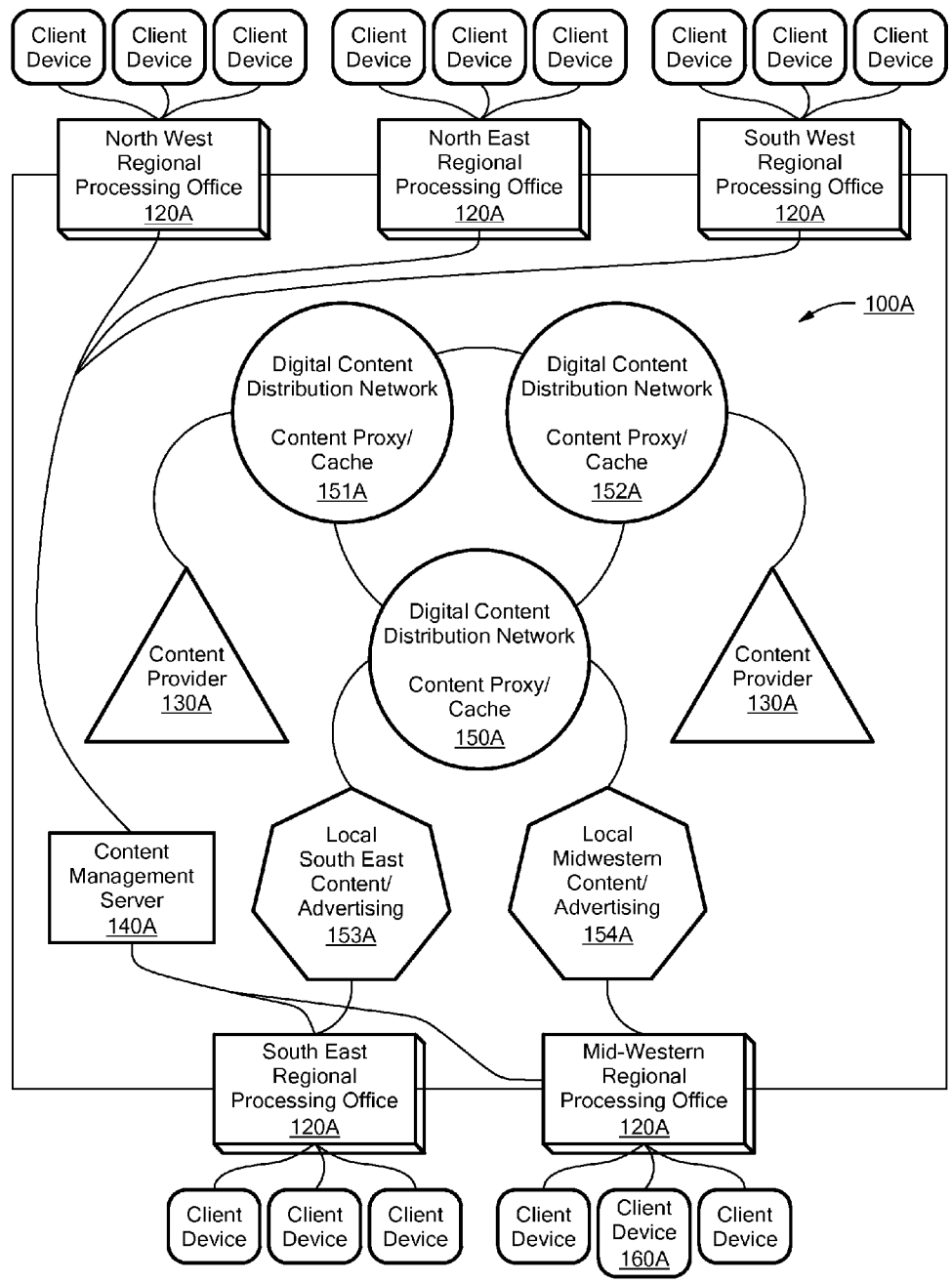
FIG. 1A shows the regional processing offices and the video content distribution network.

FIG. 1A shows the interoperation between the digital content distribution network 100A, the content providers 110A and the processing offices 120A. In this example, the content providers 130A distribute content into the video content distribution network 100A. Either the content providers 130A or processors associated with the video content distribution network convert the content to an MPEG format that is compatible with the processing office's 120A creation of interactive MPEG content. A content management server 140A of the digital content distribution network 100A distributes the MPEG-encoded content among proxy/caches 150A-154A located in different regions if the content is of a global/national scope. If the content is of a regional/local scope, the content will reside in a regional/local proxy/cache. The content may be mirrored throughout the country or world at different locations in order to increase access times. When an end user, through their client device 160A, requests an application from a regional processing office, the regional processing office will access the requested application. The requested application may be located within the video content distribution network or the application may reside locally to the regional processing office or within the network of interconnected processing offices. Once the application is retrieved, the virtual machine assigned at the regional processing office will determine the video content that needs to be retrieved. The content management server 140A assists the virtual machine in locating the content within the video content distribution network. The content management server 140A can determine if the content is located on a regional or local proxy/cache and also locate the nearest proxy/cache. For example, the application may include advertising and the content management server will direct the virtual machine to retrieve the advertising from a local proxy/cache. As shown in FIG. 1A, both the Midwestern and Southeastern regional processing offices 120A also have local proxy/caches 153A, 154A. These proxy/caches may contain local news and local advertising. Thus, the scenes presented to an end user in the Southeast may appear different to an end user in the Midwest. Each end user may be presented with different local news stories or different advertising. Once the content and the application are retrieved, the virtual machine processes the content and creates an MPEG video stream. The MPEG video stream is then directed to the requesting client device. The end user may then interact with the content requesting an updated scene with new content and the virtual machine at the processing office will update the scene by requesting the new video content from the proxy/cache of the video content distribution network.

Authoring Environment

Figure 1C:
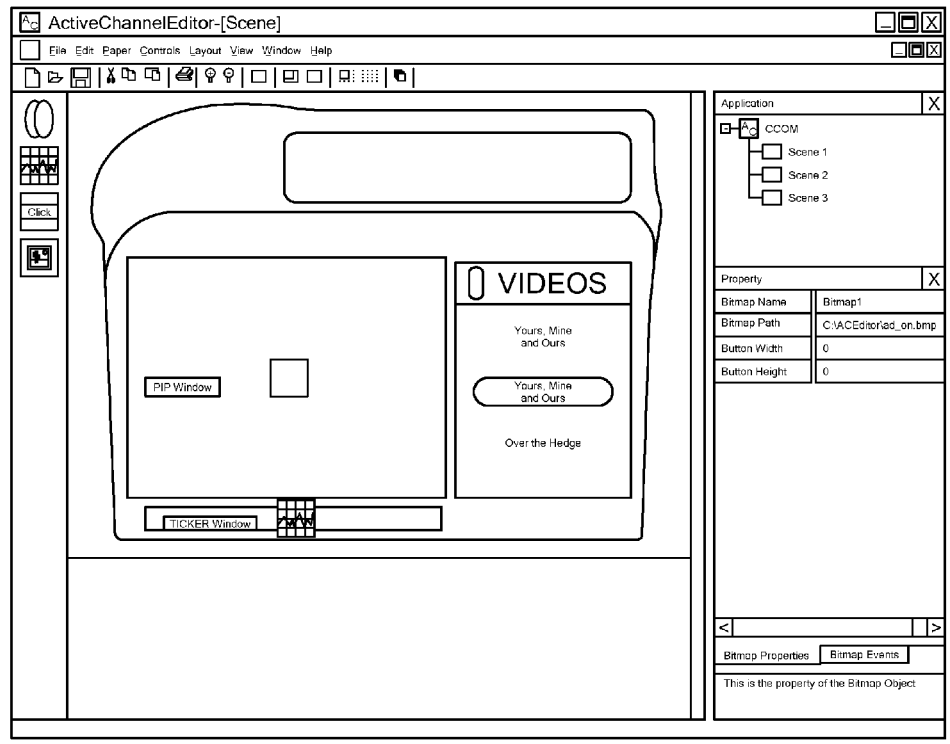
FIG. 1C shows the construction of a frame within the authoring environment.

The authoring environment includes a graphical editor as shown in FIG. 1C for developing interactive applications. An application includes one or more scenes. As shown in FIG. 1B the application window shows that the application is composed of three scenes (scene 1, scene 2 and scene 3). The graphical editor allows a developer to select elements to be placed into the scene forming a display that will eventually be shown on a display device associated with the user. In some embodiments, the elements are dragged-and-dropped into the application window. For example, a developer may want to include a media player object and media player button objects and will select these elements from a toolbar and drag and drop the elements in the window. Once a graphical element is in the window, the developer can select the element and a property window for the element is provided. The property window includes at least the location of the graphical element (address), and the size of the graphical element. If the graphical element is associated with an object, the property window will include a tab that allows the developer to switch to a bitmap event screen and alter the associated object parameters. For example, a user may change the functionality associated with a button or may define a program associated with the button.

Figure 1D:
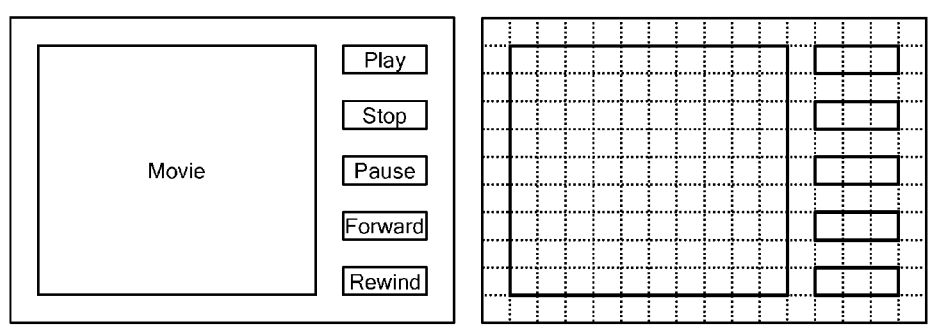
FIG. 1D shows breakdown of a frame by macroblocks into elements.

As shown in FIG. 1D, the stitcher of the system creates a series of MPEG frames for the scene based upon the AVML file that is the output of the authoring environment. Each element/graphical object within a scene is composed of different slices defining a region. A region defining an element/object may be contiguous or non-contiguous. The system snaps the slices forming the graphics on a macro-block boundary. Each element need not have contiguous slices. For example, the background has a number of non-contiguous slices each composed of a plurality of macroblocks. The background, if it is static, can be defined by intracoded macroblocks. Similarly, graphics for each of the buttons can be intracoded; however the buttons are associated with a state and have multiple possible graphics. For example, the button may have a first state "off" and a second state "on" wherein the first graphic shows an image of a button in a non-depressed state and the second graphic shows the button in a depressed state. FIG. 1C also shows a third graphical element, which is the window for the movie. The movie slices are encoded with a mix of intracoded and interceded macroblocks and dynamically changes based upon the content. Similarly if the background is dynamic, the background can be encoded with both intracoded and interceded macroblocks, subject to the requirements below regarding grooming.

When a user selects an application through a client device, the processing office will stitch together the elements in accordance with the layout from the graphical editor of the authoring environment. The output of the authoring environment includes an Active Video Mark-up Language file (AVML) The AVML file provides state information about multi-state elements such as a button, the address of the associated graphic, and the size of the graphic. The AVML file indicates the locations within the MPEG frame for each element, indicates the objects that are associated with each element, and includes the scripts that define changes to the MPEG frame based upon user's actions. For example, a user may send an instruction signal to the processing office and the processing office will use the AVML file to construct a set of new MPEG frames based upon the received instruction signal. A user may want to switch between various video elements and may send an instruction signal to the processing office. The processing office will remove a video element within the layout for a frame and will select the second video element causing the second video element to be stitched into the MPEG frame at the location of the first video element. This process is described below.

AVML File

The application programming environment outputs an AVML file. The AVML file has an XML-based syntax. The AVML file syntax includes a root object <AVML>. Other top level tags include <initialscene> that specifies the first scene to be loaded when an application starts. The <script> tag identifies a script and a <scene> tag identifies a scene. There may also be lower level tags to each of the top level tags, so that there is a hierarchy for applying the data within the tag. For example, a top level stream tag may include <aspect ratio> for the video stream, <video format>, <bit rate>, <audio format> and <audio bit rate>. Similarly, a scene tag may include each of the elements within the scene. For example, <background> for the background, <button> for a button object, and <static image> for a still graphic. Other tags include <size> and <pos> for the size and position of an element and may be lower level tags for each element within a scene. An example of an AVML file is provided in FIG. 1B. Further discussion of the AVML file syntax is provided in Appendix A attached hereto.

Groomer

Figure 2:
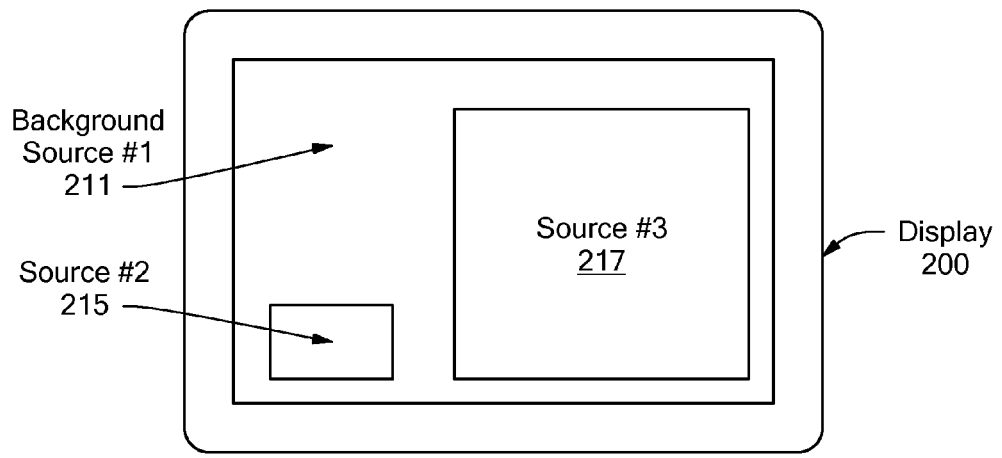
FIG. 2 is a diagram showing multiple sources composited onto a display.

FIG. 2 is a diagram of a representative display that could be provided to a television of a requesting client device. The display 200 shows three separate video content elements appearing on the screen. Element #1 211 is the background in which element #2 215 and element #3 217 are inserted.

Figure 3:
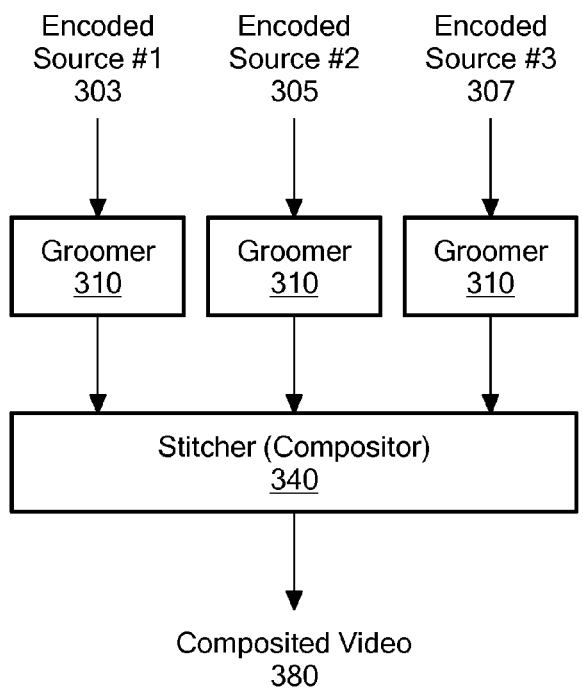
FIG. 3 is a diagram of a system incorporating grooming.

FIG. 3 shows a first embodiment of a system that can generate the display of FIG. 2. In this diagram, the three video content elements come in as encoded video: element #1 303, element #2 305, and element #3 307. The groomers 310 each receive an encoded video content element and the groomers process each element before the stitcher 340 combines the groomed video content elements into a single composited video 380. It should be understood by one of ordinary skill in the art that groomers 310 may be a single processor or multiple processors that operate in parallel. The groomers may be located either within the processing office, at content providers' facilities, or linear broadcast provider's facilities. The groomers may not be directly connected to the stitcher, as shown in FIG. 1 wherein the groomers 190 and 180 are not directly coupled to stitcher 115.

The process of stitching is described below and can be performed in a much more efficient manner if the elements have been groomed first.

Grooming removes some of the interdependencies present in compressed video. The groomer will convert I and B frames to P frames and will fix any stray motion vectors that reference a section of another frame of video that has been cropped or removed. Thus, a groomed video stream can be used in combination with other groomed video streams and encoded still images to form a composite MPEG video stream. Each groomed video stream includes a plurality of frames and the frames can be can be easily inserted into another groomed frame wherein the composite frames are grouped together to form an MPEG video stream. It should be noted that the groomed frames may be formed from one or more MPEG slices and may be smaller in size than an MPEG video frame in the MPEG video stream.

Figure 4:
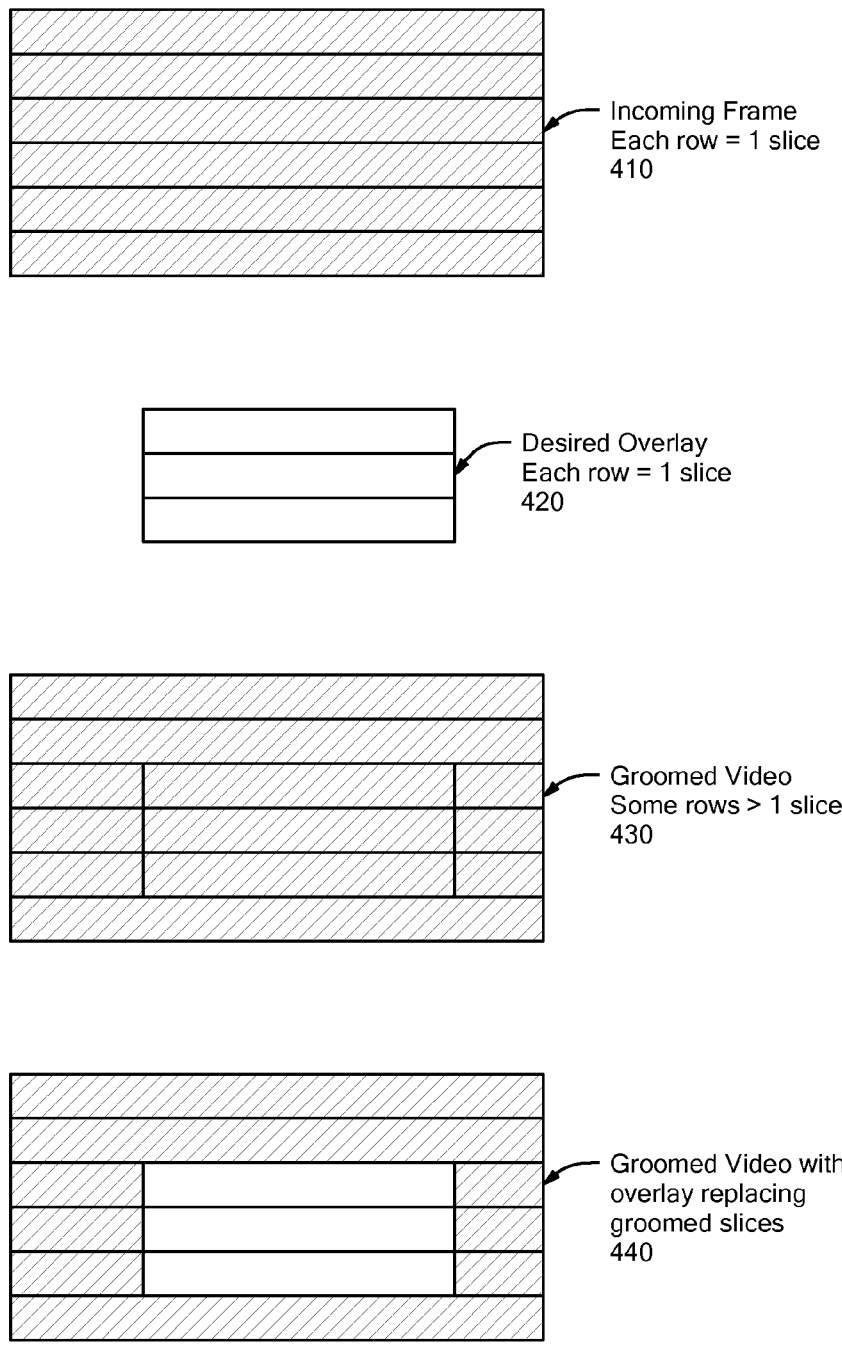
FIG. 4 is a diagram showing a video frame prior to grooming, after grooming, and with a video overlay in the groomed section.

FIG. 4 is an example of a composite video frame that contains a plurality of elements 410, 420. This composite video frame is provided for illustrative purposes. The groomers as shown in FIG. 1 only receive a single element and groom the element (video sequence), so that the video sequence can be stitched together in the stitcher. The groomers do not receive a plurality of elements simultaneously. In this example, the background video frame 410 includes 1 row per slice (this is an example only; the row could be composed of any number of slices). As shown in FIG. 1, the layout of the video frame including the location of all of the elements within the scene are defined by the application programmer in the AVML file. For example, the application programmer may design the background element for a scene. Thus, the application programmer may have the background encoded as MPEG video and may groom the background prior to having the background placed into the proxy cache 140. Therefore, when an application is requested, each of the elements within the scene of the application may be groomed video and the groomed video can easily be stitched together. It should be noted that although two groomers are shown within FIG. 1 for the content provider and for the linear broadcasters, groomers may be present in other parts of the system.

As shown, video element 420 is inserted within the background video frame 410 (also for example only; this element could also consist of multiple slices per row). If a macroblock within the original video frame 410 references another macroblock in determining its value and the reference macroblock is removed from the frame because the video image 420 is inserted in its place, the macroblocks value needs to be recalculated. Similarly, if a macroblock references another macroblock in a subsequent frame and that macroblock is removed and other source material is inserted in its place, the macroblock values need to be recalculated. This is addressed by grooming the video 430. The video frame is processed so that the rows contain multiple slices some of which are specifically sized and located to match the substitute video content. After this process is complete, it is a simple task to replace some of the current slices with the overlay video resulting in a groomed video with overlay 440. The groomed video stream has been specifically defined to address that particular overlay. A different overlay would dictate different grooming parameters. Thus, this type of grooming addresses the process of segmenting a video frame into slices in preparation for stitching. It should be noted that there is never a need to add slices to the overlay element. Slices are only added to the receiving element, that is, the element into which the overlay will be placed. The groomed video stream can contain information about the stream's groomed characteristics. Characteristics that can be provided include: 1. the locations for the upper left and lower right corners of the groomed window. 2. The location of upper left corner only and then the size of the window. The size of the slice accurate to the pixel level.

There are also two ways to provide the characteristic information in the video stream. The first is to provide that information in the slice header. The second is to provide the information in the extended data slice structure. Either of these options can be used to successfully pass the necessary information to future processing stages, such as the virtual machine and stitcher.

Figure 5:
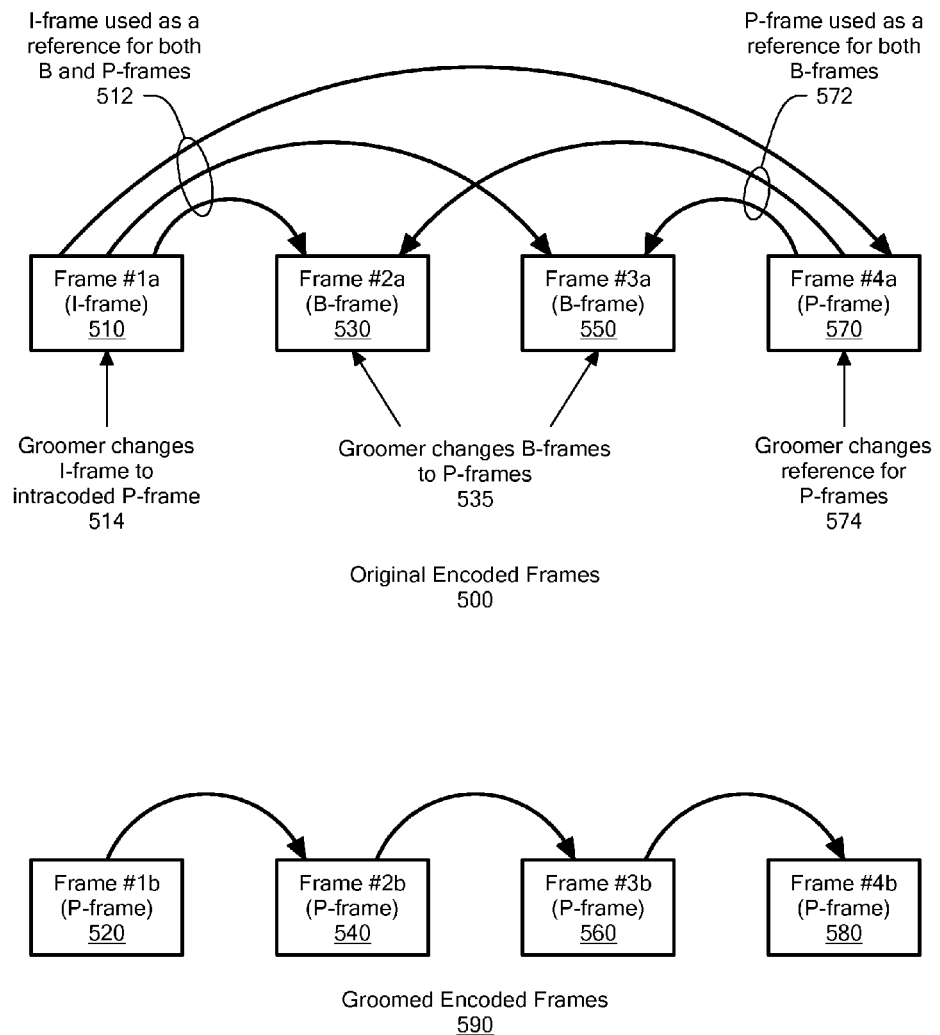
FIG. 5 is a diagram showing how grooming is done, for example, removal of B-frames.

FIG. 5 shows the video sequence for a video graphical element before and after grooming. The original incoming encoded stream 500 has a sequence of MPEG I-frames 510, B-frames 530 550, and P-frames 570 as are known to those of ordinary skill in the art. In this original stream, the I-frame is used as a reference 512 for all the other frames, both B and P. This is shown via the arrows from the I-frame to all the other frames. Also, the P-frame is used as a reference frame 572 for both B-frames. The groomer processes the stream and replaces all the frames with P-frames. First the original I-frame 510 is converted to an intracoded P-frame 520. Next the B-frames 530, 550 are converted 535 to P-frames 540 and 560 and modified to reference only the frame immediately prior. Also, the P-frames 570 are modified to move their reference 574 from the original I-frame 510 to the newly created P-frame 560 immediately in preceding themselves. The resulting P-frame 580 is shown in the output stream of groomed encoded frames 590.

Figure 6:
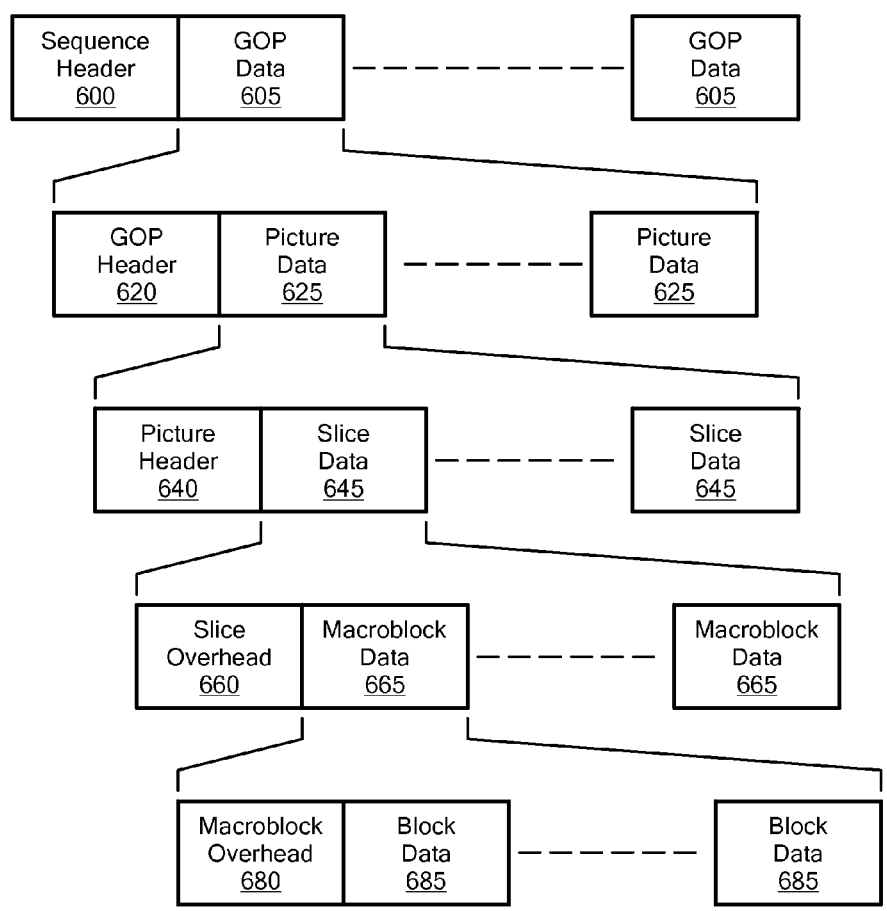
FIG. 6 is a diagram showing an MPEG frame structure.

FIG. 6 is a diagram of a standard MPEG-2 bitstream syntax. MPEG-2 is used as an example and the invention should not be viewed as limited to this example. The hierarchical structure of the bitstream starts at the sequence level. This contains the sequence header 600 followed by group of picture (GOP) data 605. The GOP data contains the GOP header 620 followed by picture data 625. The picture data 625 contains the picture header 640 followed by the slice data 645. The slice data 645 consists of some slice overhead 660 followed by macroblock data 665. Finally, the macroblock data 665 consists of some macroblock overhead 680 followed by block data 685 (the block data is broken down further but that is not required for purposes of this reference). Sequence headers act as normal in the groomer. However, there are no GOP headers output of the groomer since all frames are P-frames. The remainder of the headers may be modified to meet the output parameters required.

Figure 7:
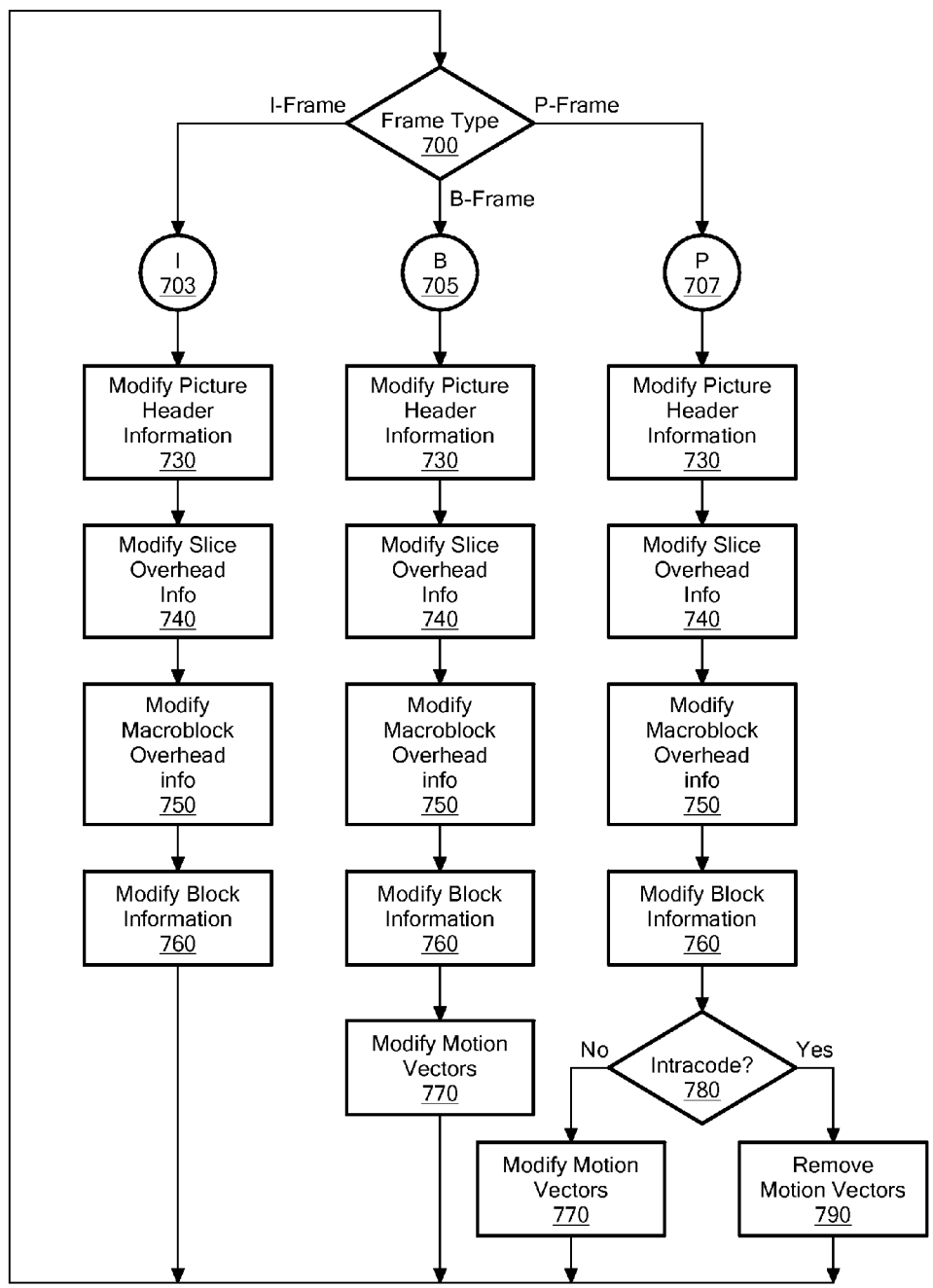
FIG. 7 is a flow chart showing the grooming process for I, B, and P frames.

FIG. 7 provides a flow for grooming the video sequence. First the frame type is determining 700: I-frame 703 B-frame 705, or P-frame 707. I-frames 703 as do B-frames 705 need to be converted to P-frames. In addition, I-frames need to match the picture information that the stitcher requires. For example, this information may indicate the encoding parameters set in the picture header. Therefore, the first step is to modify the picture header information 730 so that the information in the picture header is consistent for all groomed video sequences. The stitcher settings are system level settings that may be included in the application. These are the parameters that will be used for all levels of the bit stream. The items that require modification are provided in the table below:

TABLE 1

Picture Header Information

| # | Name | Value |
|---|------|-------|
| A | Picture Coding Type | P-Frame |
| B | Intra DC Precision | Match stitcher setting |
| C | Picture structure | Frame |
| D | Frame prediction frame DCT | Match stitcher setting |
| E | Quant scale type | Match stitcher setting |
| F | Intra VLC format | Match stitcher setting |
| G | Alternate scan | Normal scan |
| H | Progressive frame | Progressive scan |

Next, the slice overhead information 740 must be modified. The parameters to modify are given in the table below.

TABLE 2

Slice Overhead Information

| # | Name | Value |
|---|------|-------|
| A | Quantizer Scale Code | Will change if there is a "scale type" change in the picture header. |

Next, the macroblock overhead 750 information may require modification. The values to be modified are given in the table below.

TABLE 3

Macroblock Information

| # | Name | Value |
|---|---|---|
| A | Macroblock type | Change the variable length code from that for an I frame to that for a P frame) |
| B | DCT type | Set to frame if not already |
| C | Concealment motion vectors | Removed |

Finally, the block information 760 may require modification. The items to modify are given in the table below.

TABLE 4

Block Information

| # | Name | Value |
|---|---|---|
| A | DCT coefficient values | Require updating if there were any quantizer changes at the picture or slice level. |
| B | DCT coefficient ordering | Need to be reordered if "alternate scan" was changed from what it was before. |

Once the block changes are complete, the process can start over with the next frame of video. If the frame type is a B-frame 705, the same steps required for an I-frame are also required for the B-frame. However, in addition, the motion vectors 770 need to be modified. There are two scenarios: B-frame immediately following an I-frame or P-frame, or a B-frame following another B-frame. Should the B-frame follow either an I or P frame, the motion vector, using the I or P frame as a reference, can remain the same and only the residual would need to change. This may be as simple as converting the forward looking motion vector to be the residual.

For the B-frames that follow another B-frame, the motion vector and its residual will both need to be modified. The second B-frame must now reference the newly converted B to P frame immediately preceding it. First, the B-frame and its reference are decoded and the motion vector and the residual are recalculated. It must be noted that while the frame is decoded to update the motion vectors, there is no need to re-encode the DCT coefficients. These remain the same. Only the motion vector and residual are calculated and modified.

The last frame type is the P-frame. This frame type also follows the same path as an I-frame FIG. 8 diagrams the motion vector modification for macroblocks adjacent to a region boundary. It should be recognized that motion vectors on a region boundary are most relevant to background elements into which other video elements are being inserted. Therefore, grooming of the background elements may be accomplished by the application creator. Similarly, if a video element is cropped and is being inserted into a "hole" in the background element, the cropped element may include motion vectors that point to locations outside of the "hole". Grooming motion vectors for a cropped image may be done by the content creator if the content creator knows the size that the video element needs to be cropped, or the grooming may be accomplished by the virtual machine in combination with the element renderer and MPEG encoder if the video element to be inserted is larger than the size of the "hole" in the background.

Figure 8:
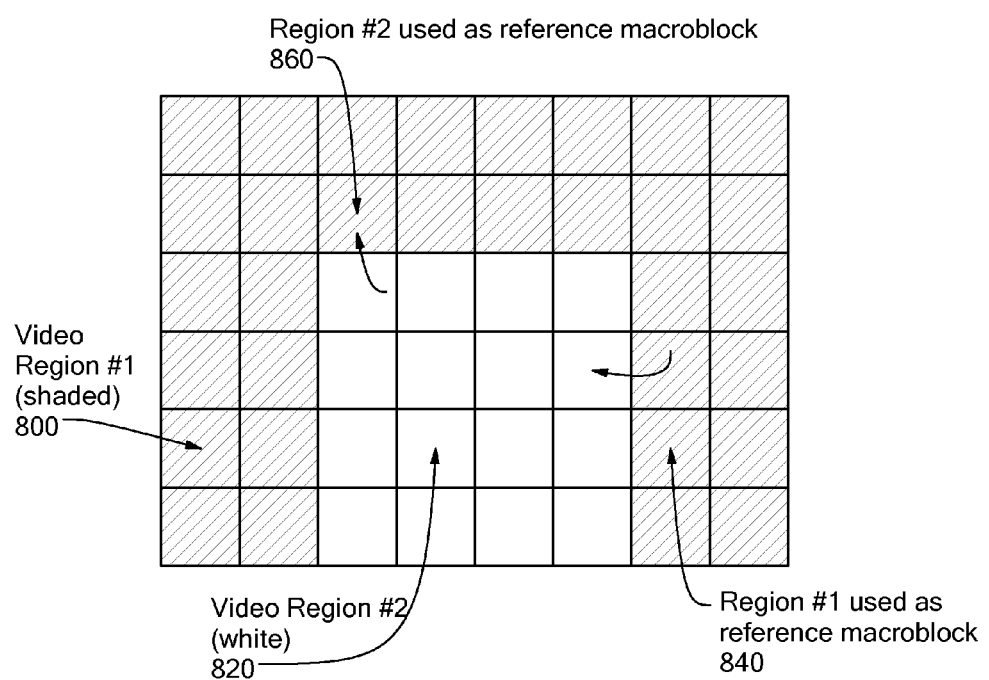
FIG. 8 is a diagram depicting removal of region boundary motion vectors.

FIG. 8 graphically shows the problems that occur with motion vectors that surround a region that is being removed from a background element. In the example of FIG. 8, the scene includes two regions: #1 800 and #2 820. There are two examples of improper motion vector references. In the first instance, region #2 820 that is inserting into region #1 800 (background), uses region #1 800 (background) as a reference for motion 840. Thus, the motion vectors in region #2 need to be corrected. The second instance of improper motion vector references occurs where region #1 800 uses region #2 820 as a reference for motion 860. The groomer removes these improper motion vector references by either re-encoding them using a frame within the same region or converting the macroblocks to be intracoded blocks.

Figure 9:
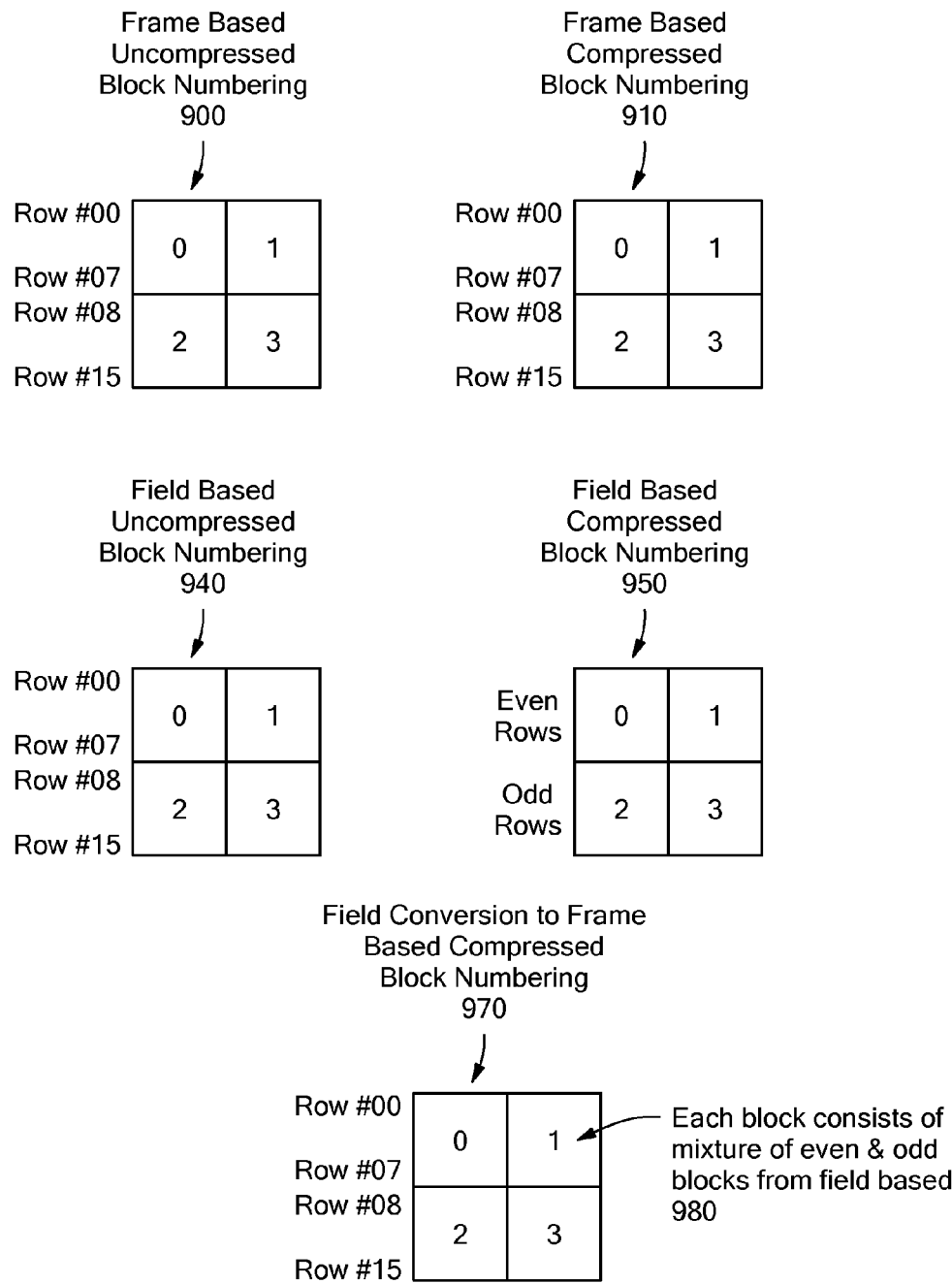
FIG. 9 is a diagram showing the reordering of the DCT coefficients.

In addition to updating motion vectors and changing frame types, the groomer may also convert field based encoded macroblocks to frame based encoded macroblocks. FIG. 9 shows the conversion of a field based encoded macroblocks to frame based. For reference, a frame based set of blocks 900 is compressed. The compressed block set 910 contains the same information in the same blocks but now it is contained in compressed form. On the other hand, a field based macroblock 940 is also compressed. When this is done, all the even rows (0, 2, 4, 6) are placed in the upper blocks (0 & 1) while the odd rows (1, 3, 5, 7) are placed in the lower blocks (2&3). When the compressed field based macroblock 950 is converted to a frame based macroblock 970, the coefficients need to be moved from one block to another 980. That is, the rows must be reconstructed in numerical order rather than in even odd. Rows 1 & 3, which in the field based encoding were in blocks 2 & 3, are now moved back up to blocks 0 or 1 respectively. Correspondingly, rows 4 & 6 are moved from blocks 0 & 1 and placed down in blocks 2 & 3.

Figure 10:
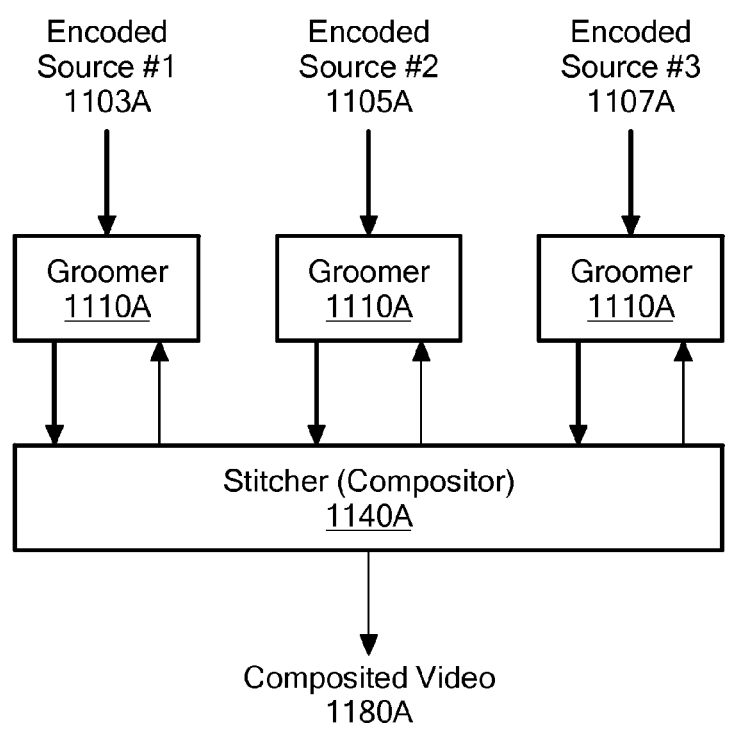
FIG. 10 shows an alternative groomer.

FIG. 10 shows a second embodiment of the grooming platform. All the components are the same as the first embodiment: groomers 1110A and stitcher 1130A. The inputs are also the same: input #1 1103A, input #2 1105A, and input #3 1107A as well as the composited output 1280. The difference in this system is that the stitcher 1140A provides feedback, both synchronization and frame type information, to each of the groomers 1110A. With the synchronization and frame type information, the stitcher 1240 can define a GOP structure that the groomers 1110A follow. With this feedback and the GOP structure, the output of the groomer is no longer P-frames only but can also include I-frames and B-frames. The limitation to an embodiment without feedback is that no groomer would know what type of frame the stitcher was building. In this second embodiment with the feedback from the stitcher 1140A, the groomers 1110A will know what picture type the stitcher is building and so the groomers will provide a matching frame type. This improves the picture quality assuming the same data rate and may decrease the data rate assuming that the quality level is kept constant due to more reference frames and less modification of existing frames while, at the same time, reducing the bit rate since B-frames are allowed.

Stitcher

Figure 11:
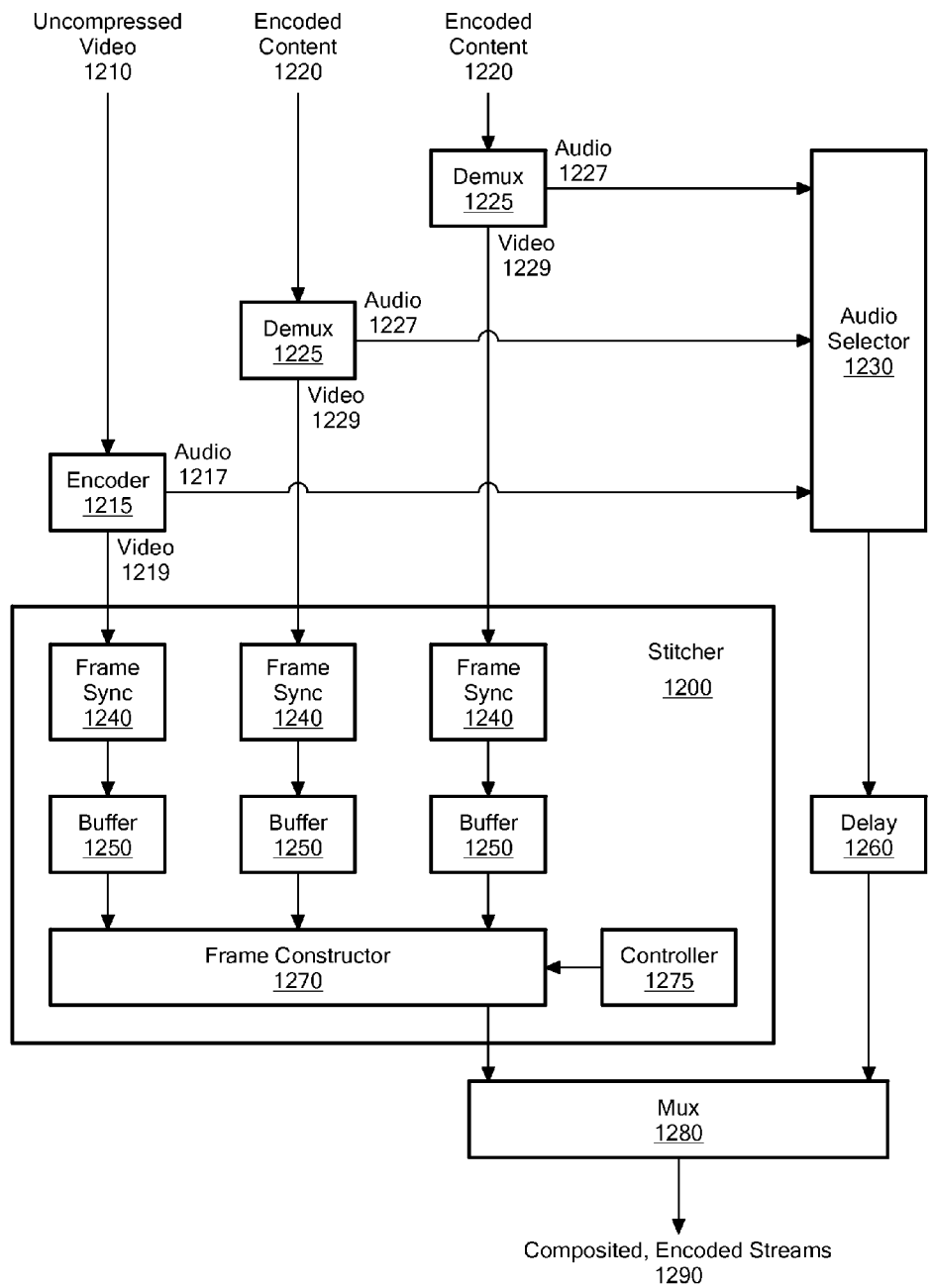
FIG. 11 shows an environment for a stitcher module.

FIG. 11 shows an environment for implementing a stitcher module, such as the stitcher shown in FIG. 1. The stitcher 1200 receives video elements from different sources. Uncompressed content 1210 is encoded in an encoder 1215, such as the MPEG element encoder shown in FIG. 1 prior to its arrival at the stitcher 1200. Compressed or encoded video 1220 does not need to be encoded. There is, however, the need to separate the audio 1217 1227 from the video 1219 1229 in both cases. The audio is fed into an audio selector 1230 to be included in the stream. The video is fed into a frame synchronization block 1240 before it is put into a buffer 1250. The frame constructor 1270 pulls data from the buffers 1250 based on input from the controller 1275. The video out of the frame constructor 1270 is fed into a multiplexer 1280 along with the audio after the audio has been delayed 1260 to align with the video. The multiplexer 1280 combines the audio and video streams and outputs the composited, encoded output streams 1290 that can be played on any standard decoder. Multiplexing a data stream into a program or transport stream is well known to those familiar in the art. The encoded video sources can be real-time, from a stored location, or a combination of both. There is no requirement that all of the sources arrive in real-time.

Figure 12:
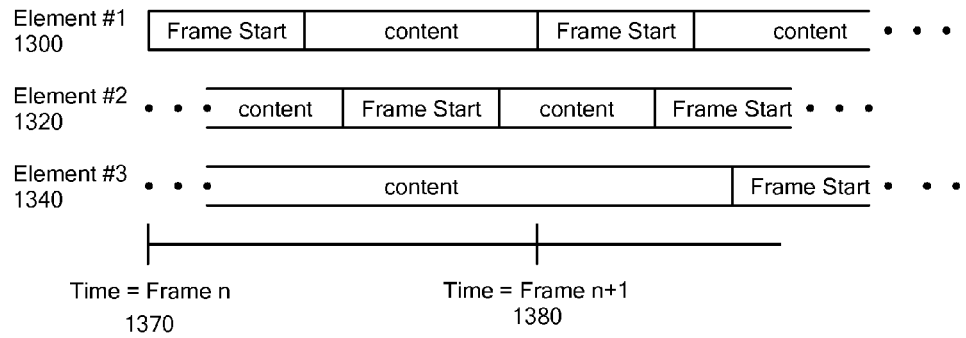
FIG. 12 is a diagram showing video frames starting in random positions relative to each other.

FIG. 12 shows an example of three video content elements that are temporally out of sync. In order to synchronize the three elements, element #1 1300 is used as an "anchor" or "reference" frame. That is, it is used as the master frame and all other frames will be aligned to it (this is for example only; the system could have its own master frame reference separate from any of the incoming video sources). The output frame timing 1370 1380 is set to match the frame timing of element #1 1300. Elements #2 & 3 1320 and 1340 do not align with element #1 1300. Therefore, their frame start is located and they are stored in a buffer. For example, element #2 1320 will be delayed one frame so an entire frame is available before it is composited along with the reference frame. Element #3 is much slower than the reference frame. Element #3 is collected over two frames and presented over two frames. That is, each frame of element #3 1340 is displayed for two consecutive frames in order to match the frame rate of the reference frame. Conversely if a frame, not shown, was running at twice the rate of the reference frame, then every other frame would be dropped (not shown). More than likely all elements are running at almost the same speed so only infrequently would a frame need to be repeated or dropped in order to maintain synchronization.

Figure 13:
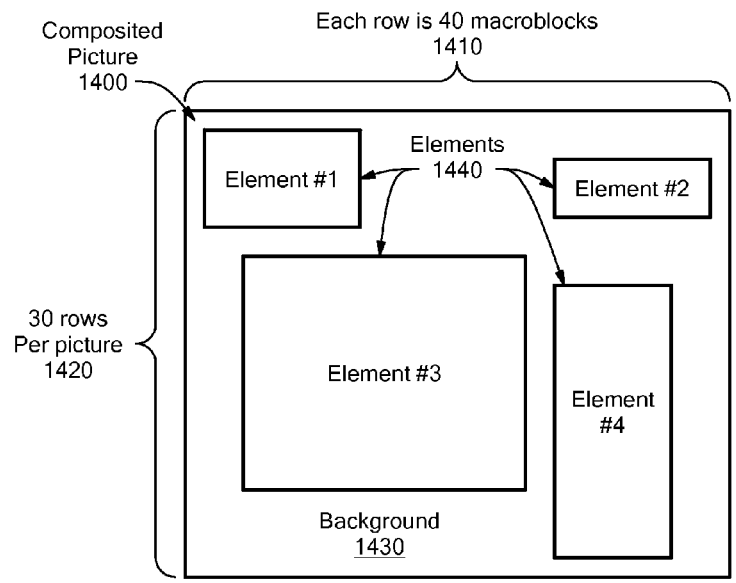
FIG. 13 is a diagram of a display with multiple MPEG elements composited within the picture.

FIG. 13 shows an example composited video frame 1400. In this example, the frame is made up of 40 macroblocks per row 1410 with 30 rows per picture 1420. The size is used as an example and it not intended to restrict the scope of the invention. The frame includes a background 1430 that has elements 1440 composited in various locations. These elements 1440 can be video elements, static elements, etc. That is, the frame is constructed of a full background, which then has particular areas replaced with different elements. This particular example shows four elements composited on a background.

Figure 14:
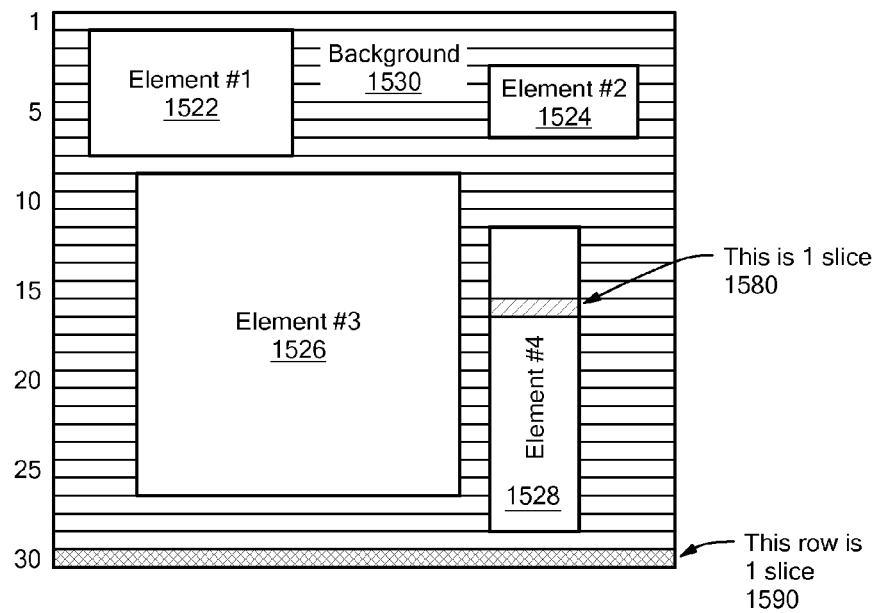
FIG. 14 is a diagram showing the slice breakdown of a picture consisting of multiple elements.

FIG. 14 shows a more detailed version of the screen illustrating the slices within the picture. The diagram depicts a picture consisting of 40 macroblocks per row and 30 rows per picture (non-restrictive, for illustration purposes only). However, it also shows the picture divided up into slices. The size of the slice can be a full row 1590 (shown as shaded) or a few macroblocks within a row 1580 (shown as rectangle with diagonal lines inside element #4 1528). The background 1530 has been broken into multiple regions with the slice size matching the width of each region. This can be better seen by looking at element #1 1522. Element #1 1522 has been defined to be twelve macroblocks wide. The slice size for this region for both the background 1530 and element #1 1522 is then defined to be that exact number of macroblocks. Element #1 1522 is then comprised of six slices, each slice containing 12 macroblocks. In a similar fashion, element #2 1524 consists of four slices of eight macroblocks per slice; element #3 1526 is eighteen slices of 23 macroblocks per slice; and element #4 1528 is seventeen slices of five macroblocks per slice. It is evident that the background 1530 and the elements can be defined to be composed of any number of slices which, in turn, can be any number of macroblocks. This gives full flexibility to arrange the picture and the elements in any fashion desired. The process of determining the slice content for each element along with the positioning of the elements within the video frame are determined by the virtual machine of FIG. 1 using the AVML file.

Figure 15:
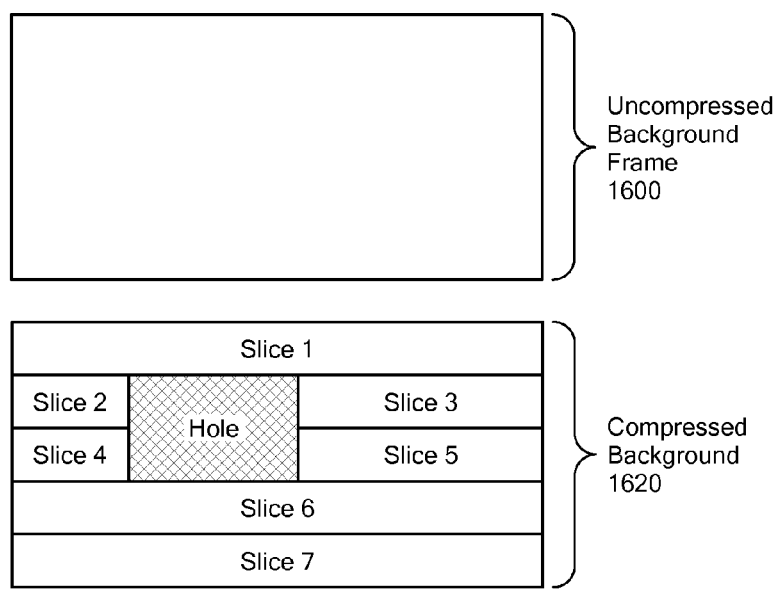
FIG. 15 is a diagram showing slice based encoding in preparation for stitching.

FIG. 15 shows the preparation of the background 1600 by the virtual machine in order for stitching to occur in the stitcher. The virtual machine gathers an uncompressed background based upon the AVML file and forwards the background to the element encoder. The virtual machine forwards the locations within the background where elements will be placed in the frame. As shown the background 1620 has been broken into a particular slice configuration by the virtual machine with a hole(s) that exactly aligns with where the element(s) will (are to) be placed prior to passing the background to the element encoder. The encoder compresses the background leaving a "hole" or "holes" where the element(s) will be placed. The encoder passes the compressed background to memory. The virtual machine then access the memory and retrieves each element for a scene and passes the encoded elements to the stitcher along with a list of the locations for each slice for each of the elements. The stitcher takes each of the slices and places the slices into the proper position.

This particular type of encoding is called "slice based encoding". A slice based encoder/virtual machine is one that is aware of the desired slice structure of the output frame and performs its encoding appropriately. That is, the encoder knows the size of the slices and where they belong. It knows where to leave holes if that is required. By being aware of the desired output slice configuration, the virtual machine provides an output that is easily stitched.

Figure 16:
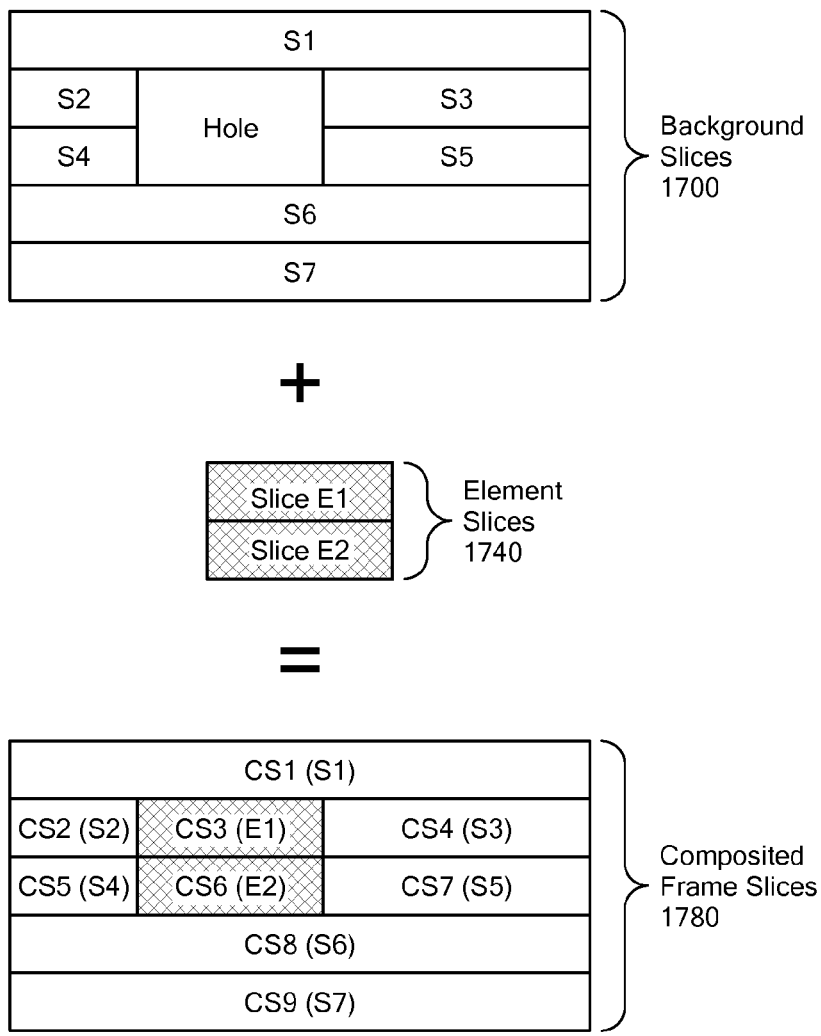
FIG. 16 is a diagram detailing the compositing of a video element into a picture.

FIG. 16 shows the compositing process after the background element has been compressed. The background element 1700 has been compressed into seven slices with a hole where the element 1740 is to be placed. The composite image 1780 shows the result of the combination of the background element 1700 and element 1740. The composite video frame 1780 shows the slices that have been inserted in grey. Although this diagram depicts a single element composited onto a background, it is possible to composite any number of elements that will fit onto a user's display. Furthermore, the number of slices per row for the background or the element can be greater than what is shown. The slice start and slice end points of the background and elements must align.

Figure 17:
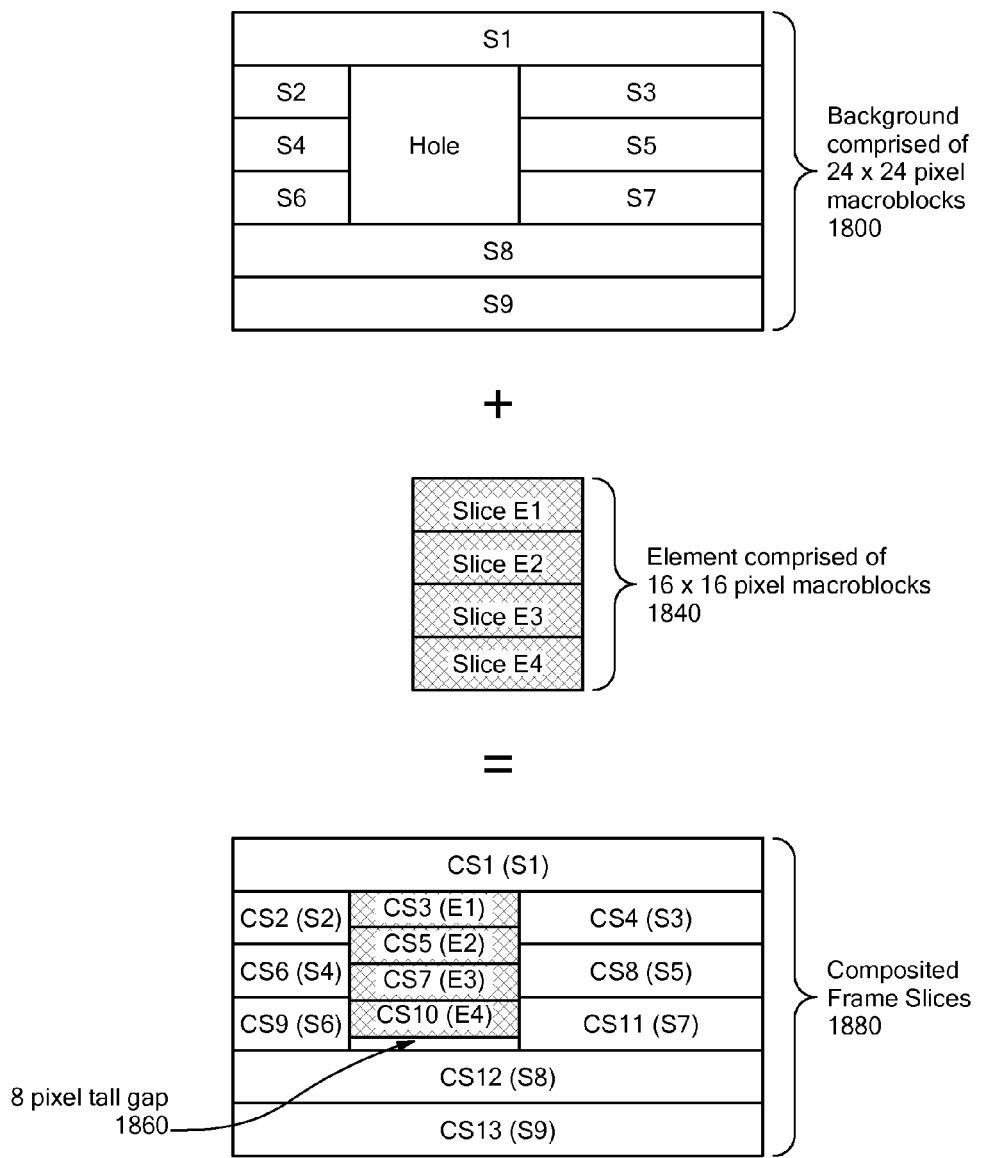
FIG. 17 is a diagram detailing compositing of a 16×16 sized macroblock element into a background comprised of 24×24 sized macroblocks.

FIG. 17 is a diagram showing different macroblock sizes between the background element 1800 (24 pixels by 24 pixels) and the added video content element 1840 (16 pixels by 16 pixels). The composited video frame 1880 shows two cases. Horizontally, the pixels align as there are 24 pixels/block×4 blocks=96 pixels wide in the background 800 and 16 pixels/block*6 blocks=96 pixels wide for the video content element 1840. However, vertically, there is a difference. The background 1800 is 24 pixels/block*3 blocks=72 pixels tall. The element 1840 is 16 pixels/block*4 blocks=64 pixels tall. This leaves a vertical gap of 8 pixels 1860. The stitcher is aware of such differences and can extrapolate either the element or the background to fill the gap. It is also possible to leave a gap so that there is a dark or light border region. Any combination of macroblock sizes is acceptable even though this example uses macroblock sizes of 24×24 and 16×16. DCT based compression formats may rely on macroblocks of sizes other than 16×16 without deviating from the intended scope of the invention. Similarly, a DCT based compression format may also rely on variable sized macroblocks for temporal prediction without deviating from the intended scope of the invention Finally, frequency domain representations of content may also be achieved using other Fourier related transforms without deviating from the intended scope of the invention.

It is also possible for there to be an overlap in the composited video frame. Referring back to FIG. 17, the element 1840 consisted of four slices. Should this element actually be five slices, it would overlap with the background element 1800 in the composited video frame 1880. There are multiple ways to resolve this conflict with the easiest being to composite only four slices of the element and drop the fifth. It is also possible to composite the fifth slice into the background row, break the conflicting background row into slices and remove the background slice that conflicts with the fifth element slice (then possibly add a sixth element slice to fill any gap).

The possibility of different slice sizes requires the compositing function to perform a check of the incoming background and video elements to confirm they are proper. That is, make sure each one is complete (e.g., a full frame), there are no sizing conflicts, etc.

Figure 18:
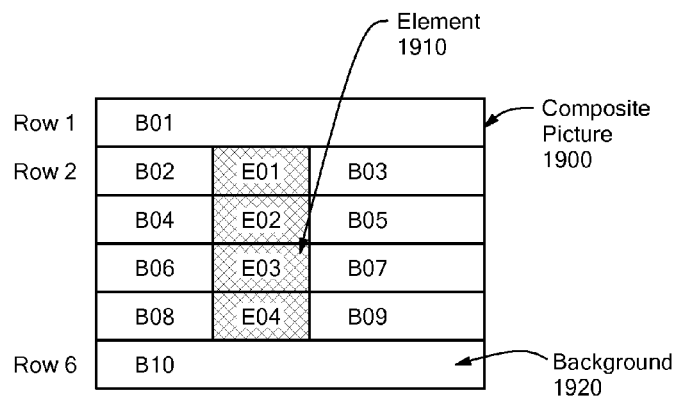
FIG. 18 is a diagram depicting elements of a frame.
Figure 18:
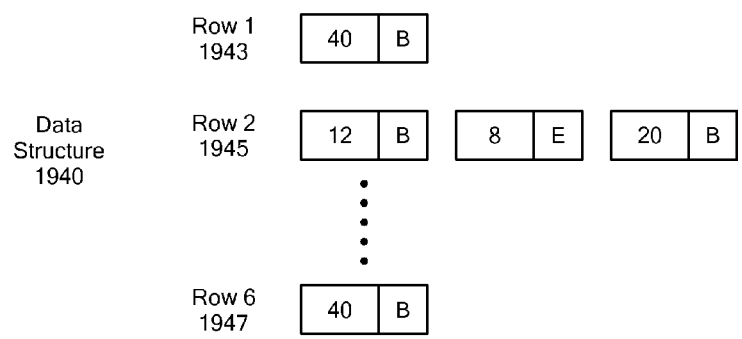
Figure 18:
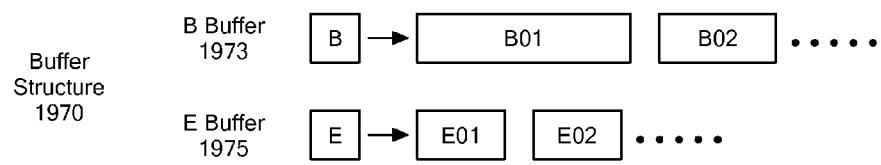

FIG. 18 is a diagram depicting elements of a frame. A simple composited picture 1900 is composed of an element 1910 and a background element 1920. To control the building of the video frame for the requested scene, the stitcher builds a data structure 1940 based upon the position information for each element as provided by the virtual machine. The data structure 1940 contains a linked list describing how many macroblocks and where the macroblocks are located. For example, the data row 1 1943 shows that the stitcher should take 40 macroblocks from buffer B, which is the buffer for the background. Data row 2 1945 should take 12 macroblocks from buffer B, then 8 macroblocks from buffer E (the buffer for element 1910), and then another 20 macroblocks from buffer B. This continues down to the last row 1947 wherein the stitcher uses the data structure to take 40 macroblocks from buffer B. The buffer structure 1970 has separate areas for each background or element. The B buffer 1973 contains all the information for stitching in B macroblocks. The E buffer 1975 has the information for stitching in E macroblocks.

Figure 19:
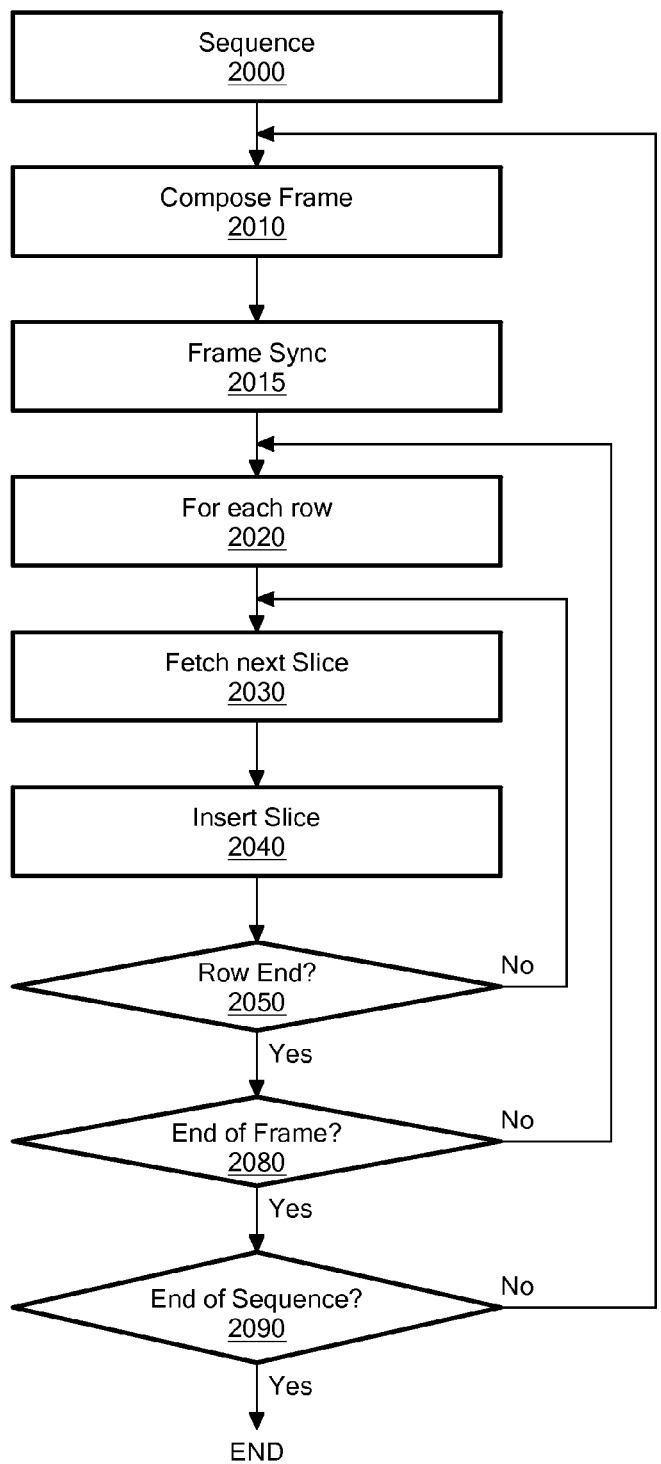
FIG. 19 is a flowchart depicting compositing multiple encoded elements.

FIG. 19 is a flow chart depicting the process for building a picture from multiple encoded elements. The sequence 2000 begins by starting the video frame composition 2010. First the frames are synchronized 2015 and then each row 2020 is built up by grabbing the appropriate slice 2030. The slice is then inserted 2040 and the system checks to see if it is the end of the row 2050. If not, the process goes back to "fetch next slice" block 2030 until the end of row 2050 is reached. Once the row is complete, the system checks to see if it is the end of frame 2080. If not, the process goes back to the "for each row" 2020 block. Once the frame is complete, the system checks if it is the end of the sequence 2090 for the scene. If not, it goes back to the "compose frame" 2010 step. If it is, the frame or sequence of video frames for the scene is complete 2090. If not, it repeats the frame building process. If the end of sequence 2090 has been reached, the scene is complete and the process ends or it can start the construction of another frame.

The performance of the stitcher can be improved (build frames faster with less processor power) by providing the stitcher advance information on the frame format. For example, the virtual machine may provide the stitcher with the start location and size of the areas in the frame to be inserted. Alternatively, the information could be the start location for each slice and the stitcher could then figure out the size (the difference between the two start locations). This information could be provided externally by the virtual machine or the virtual machine could incorporate the information into each element. For instance, part of the slice header could be used to carry this information. The stitcher can use this foreknowledge of the frame structure to begin compositing the elements together well before they are required.

Figure 20:
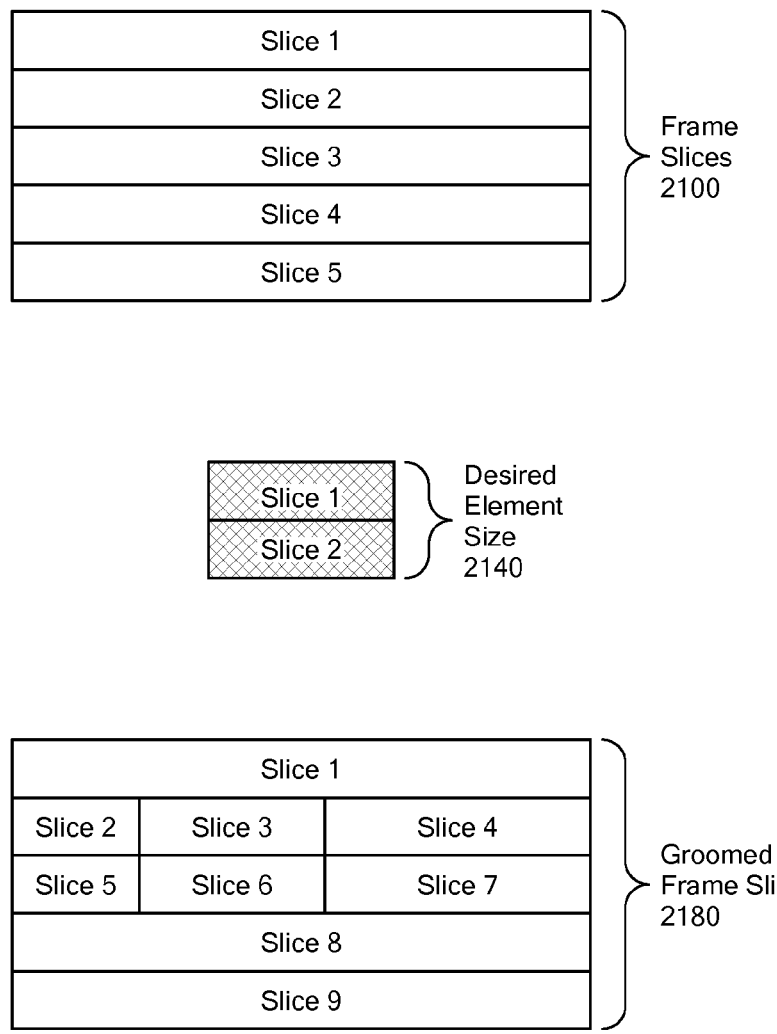
FIG. 20 is a diagram showing that the composited element does not need to be rectangular nor contiguous.

FIG. 20 shows a further improvement on the system. As explained above in the groomer section, the graphical video elements can be groomed thereby providing stitchable elements that are already compressed and do not need to be decoded in order to be stitched together. In FIG. 20, a frame has a number of encoded slices 2100. Each slice is a full row (this is used as an example only; the rows could consist of multiple slices prior to grooming). The virtual machine in combination with the AVML file determines that there should be an element 2140 of a particular size placed in a particular location within the composited video frame. The groomer processes the incoming background 2100 and converts the full-row encoded slices to smaller slices that match the areas around and in the desired element 2140 location. The resulting groomed video frame 2180 has a slice configuration that matches the desired element 2140. The stitcher then constructs the stream by selecting all the slices except #3 and #6 from the groomed frame 2180. Instead of those slices, the stitcher grabs the element 2140 slices and uses those in its place. In this manner, the background never leaves the compressed domain and the system is still able to composite the element 2140 into the frame.

Figure 21:
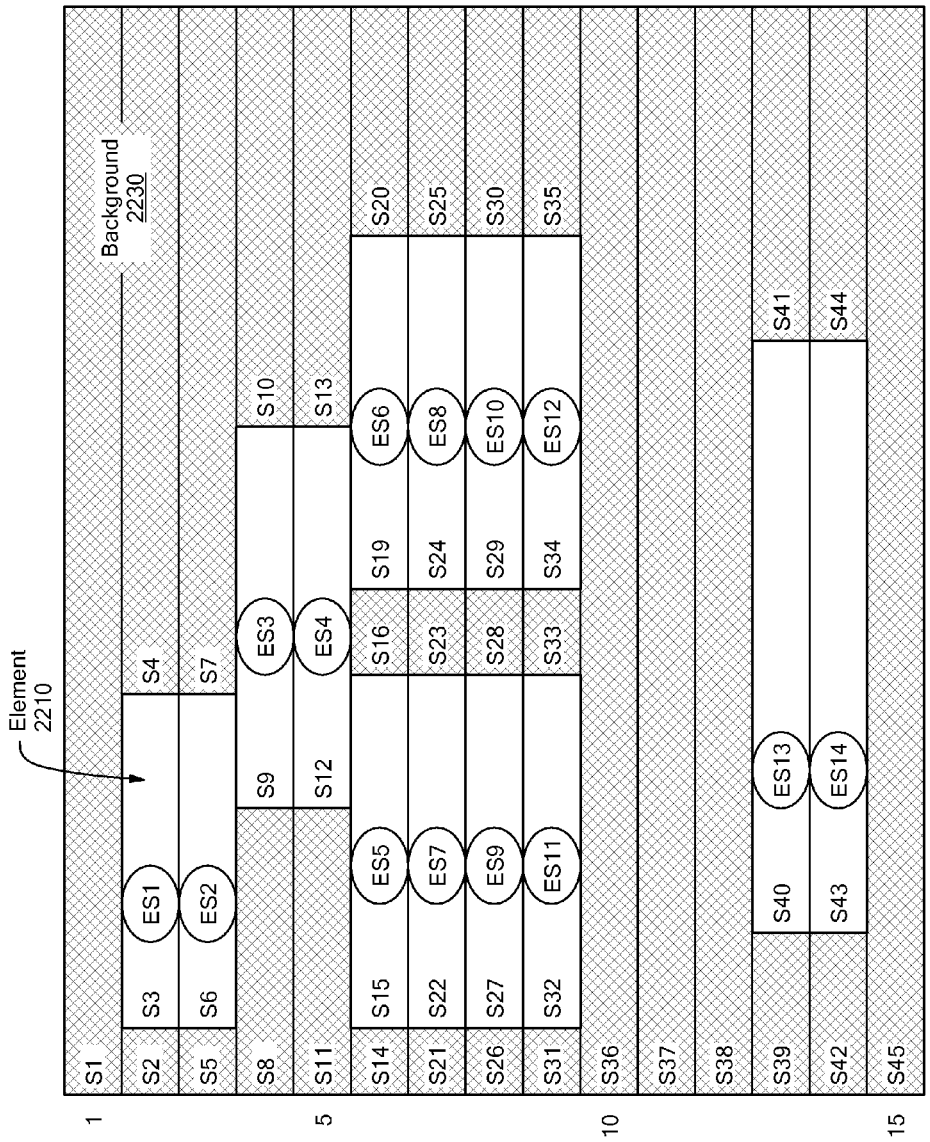
FIG. 21 shows a diagram of elements on a screen wherein a single element is non-contiguous.

FIG. 21 shows the flexibility available to define the element to be composited. Elements can be of different shapes and sizes. The elements need not reside contiguously and in fact a single element can be formed from multiple images separated by the background. This figure shows a background element 2230 (areas colored grey) that has had a single element 2210 (areas colored white) composited on it. In this diagram, the composited element 2210 has areas that are shifted, are different sizes, and even where there are multiple parts of the element on a single row. The stitcher can perform this stitching just as if there were multiple elements used to create the display. The slices for the frame are labeled contiguously S1-S45. These include the slice locations where the element will be placed. The element also has its slice numbering from ES1-ES14. The element slices can be placed in the background where desired even though they are pulled from a single element file.

The source for the element slices can be any one of a number of options. It can come from a real-time encoded source. It can be a complex slice that is built from separate slices, one having a background and the other having text. It can be a pre-encoded element that is fetched from a cache. These examples are for illustrative purposes only and are not intended to limit the options for element sources.

Figure 22:
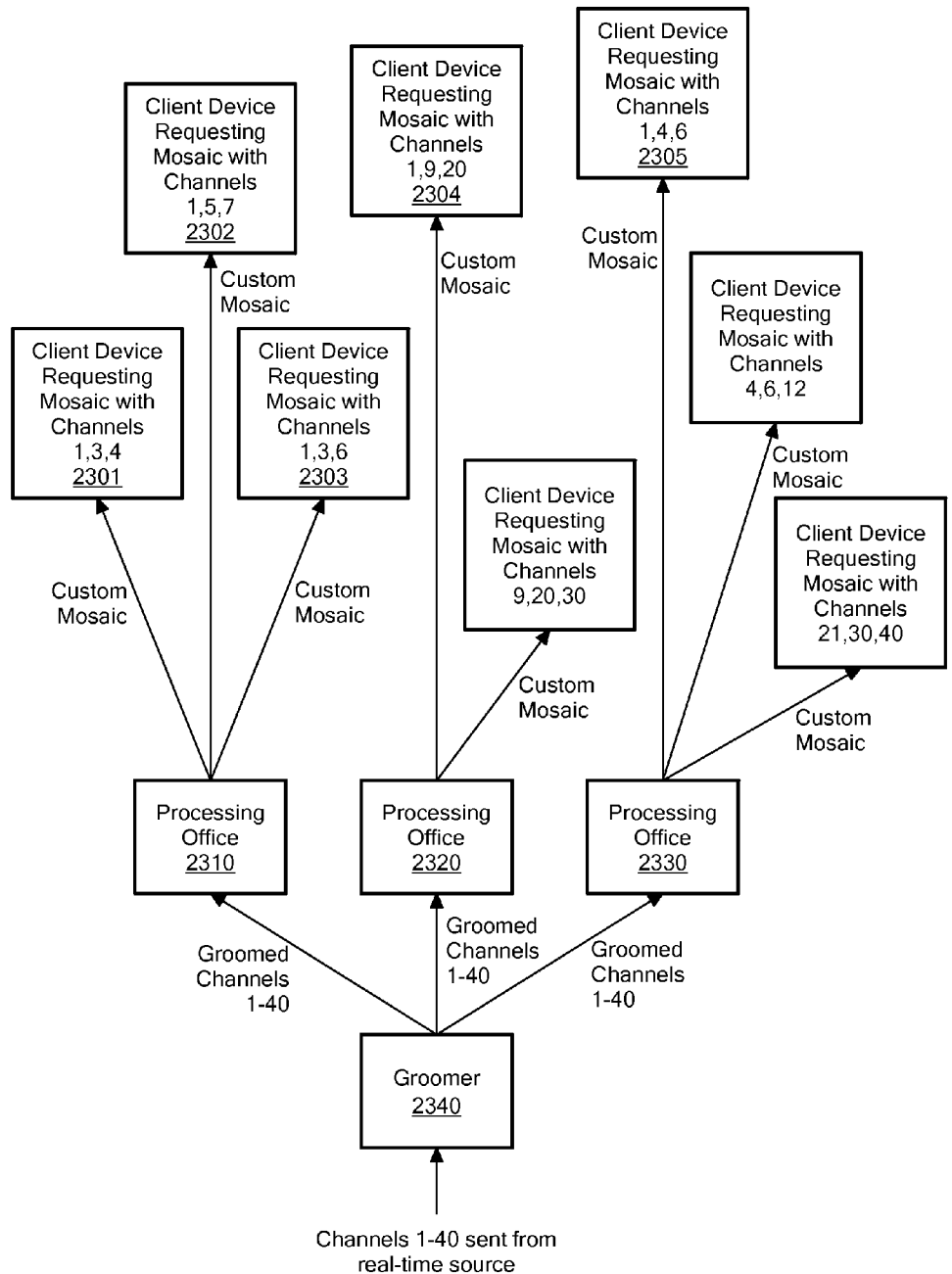
FIG. 22 shows a groomer for grooming linear broadcast content for multicasting to a plurality of processing offices and/or session processors.
Figure 23:
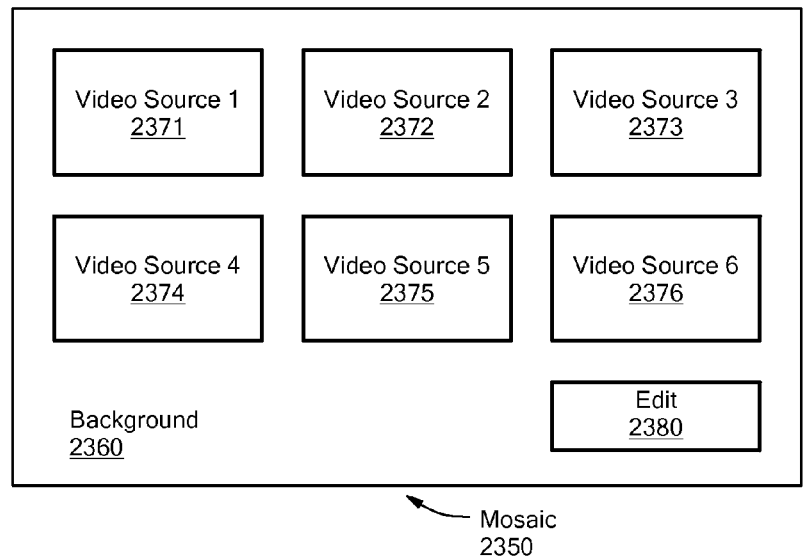
FIG. 23 shows an example of a customized mosaic when displayed on a display device.

FIG. 22 shows an embodiment using a groomer 2340 for grooming linear broadcast content. The content is received by the groomer 2340 in real-time. Each channel is groomed by the groomer 2340 so that the content can be easily stitched together. The groomer 2340 of FIG. 22 may include a plurality of groomer modules for grooming all of the linear broadcast channels. The groomed channels may then be multicast to one or more processing offices 2310, 2320, 2330 and one or more virtual machines within each of the processing offices for use in applications. As shown, client devices request an application for receipt of a mosaic 2350 of linear broadcast sources and/or other groomed content that are selected by the client. A mosaic 2350 is a scene that includes a background frame 2360 that allows for viewing of a plurality of sources 2371-2376 simultaneously as shown in FIG. 23. For example, if there are multiple sporting events that a user wishes to watch, the user can request each of the channels carrying the sporting events for simultaneous viewing within the mosaic.

The user can even select an MPEG object (edit) 2380 and then edit the desired content sources to be displayed. For example, the groomed content can be selected from linear/live broadcasts and also from other video content (i.e. movies, pre-recorded content etc.). A mosaic may even include both user selected material and material provided by the processing office/session processor, such as, advertisements. As shown in FIG. 22, client devices 2301-2305 each request a mosaic that includes channel 1. Thus, the multicast groomed content for channel 1 is used by different virtual machines and different processing offices in the construction of personalized mosaics.

When a client device sends a request for a mosaic application, the processing office associated with the client device assigns a processor/virtual machine for the client device for the requested mosaic application. The assigned virtual machine constructs the personalized mosaic by compositing the groomed content from the desired channels using a stitcher. The virtual machine sends the client device an MPEG stream that has a mosaic of the channels that the client has requested. Thus, by grooming the content first so that the content can be stitched together, the virtual machines that create the mosaics do not need to first decode the desired channels, render the channels within the background as a bitmap and then encode the bitmap.

An application, such as a mosaic, can be requested either directly through a client device or indirectly through another device, such as a PC, for display of the application on a display associated with the client device. The user could log into a website associated with the processing office by providing information about the user's account. The server associated with the processing office would provide the user with a selection screen for selecting an application. If the user selected a mosaic application, the server would allow the user to select the content that the user wishes to view within the mosaic. In response to the selected content for the mosaic and using the user's account information, the processing office server would direct the request to a session processor and establish an interactive session with the client device of the user. The session processor would then be informed by the processing office server of the desired application. The session processor would retrieve the desired application, the mosaic application in this example, and would obtain the required MPEG objects. The processing office server would then inform the session processor of the requested video content and the session processor would operate in conjunction with the stitcher to construct the mosaic and provide the mosaic as an MPEG video stream to the client device. Thus, the processing office server may include scripts or application for performing the functions of the client device in setting up the interactive session, requesting the application, and selecting content for display. While the mosaic elements may be predetermined by the application, they may also be user configurable resulting in a personalized mosaic.

Figure 24:
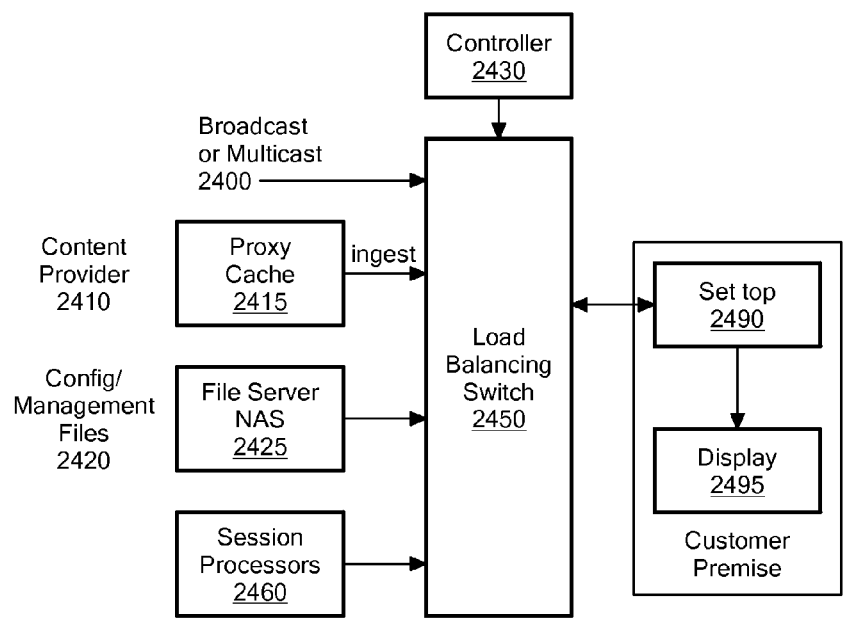
FIG. 24 is a diagram of an IP based network for providing interactive MPEG content.

FIG. 24 is a diagram of an IP based content delivery system. In this system, content may come from a broadcast source 2400, a proxy cache 2415 fed by a content provider 2410, Network Attached Storage (NAS) 2425 containing configuration and management files 2420, or other sources not shown. For example, the NAS may include asset metadata that provides information about the location of content. This content could be available through a load balancing switch 2460. BladeSession processors/virtual machines 2460 can perform different processing functions on the content to prepare it for delivery. Content is requested by the user via a client device such as a set top box 2490. This request is processed by the controller 2430 which then configures the resources and path to provide this content. The client device 2490 receives the content and presents it on the user's display 2495.

Figure 25:
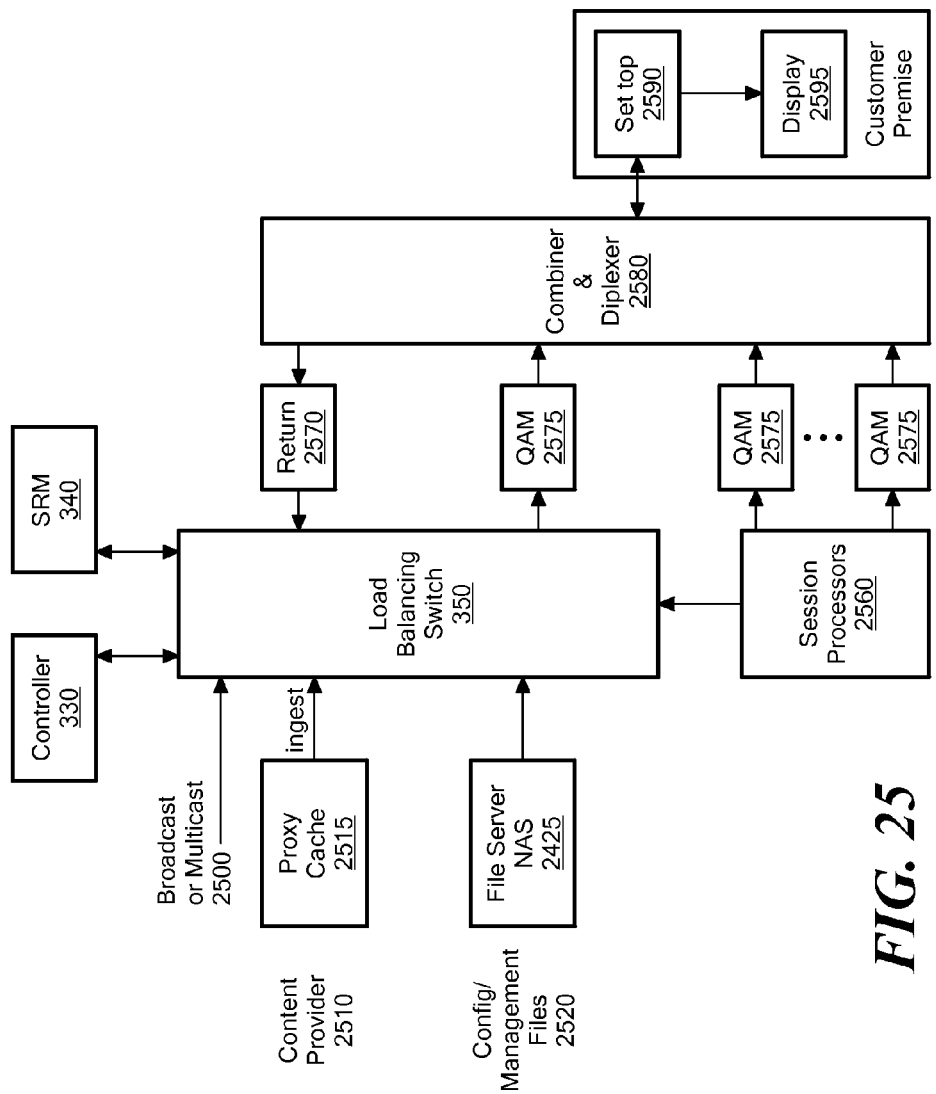
FIG. 25 is a diagram of a cable based network for providing interactive MPEG content.

FIG. 25 provides a diagram of a cable based content delivery system. Many of the components are the same: a controller 2530, broadcast source 2500, a content provider 2510 providing their content via a proxy cache 2515, configuration and management files 2520 via a file server NAS 2525, session processors 2560, load balancing switch 2550, a client device, such as a set top box 2590, and a display 2595. However, there are also a number of additional pieces of equipment required due to the different physical medium. In this case the added resources include: QAM modulators 2575, a return path receiver 2570, a combiner and diplexer 2580, and a Session and Resource Manager (SRM) 2540. QAM upconverter 2575 are required to transmit data (content) downstream to the user. These modulators convert the data into a form that can be carried across the coax that goes to the user. Correspondingly, the return path receiver 2570 also is used to demodulate the data that comes up the cable from the set top 2590. The combiner and diplexer 2580 is a passive device that combines the downstream QAM channels and splits out the upstream return channel. The SRM is the entity that controls how the QAM modulators are configured and assigned and how the streams are routed to the client device.

These additional resources add cost to the system. As a result, the desire is to minimize the number of additional resources that are required to deliver a level of performance to the user that mimics a non-blocking system such as an IP network. Since there is not a one-to-one correspondence between the cable network resources and the users on the network, the resources must be shared. Shared resources must be managed so they can be assigned when a user requires a resource and then freed when the user is finished utilizing that resource. Proper management of these resources is critical to the operator because without it, the resources could be unavailable when needed most. Should this occur, the user either receives a "please wait" message or, in the worst case, a "service unavailable" message.

Figure 26:
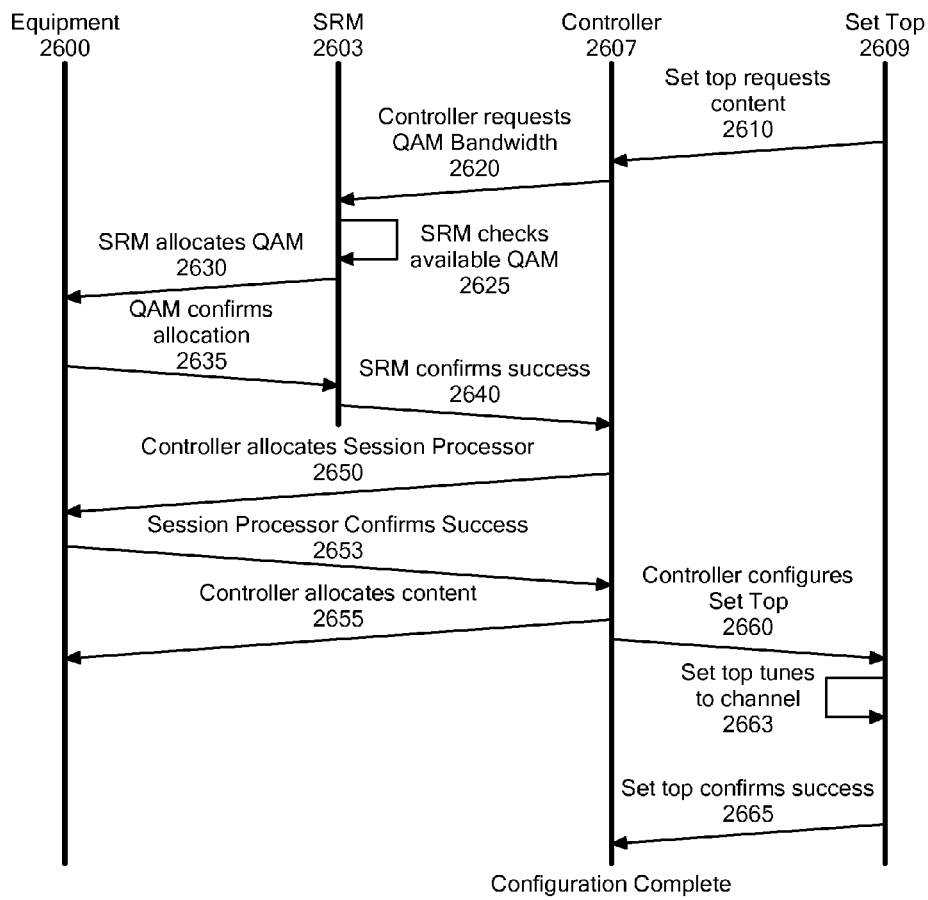
FIG. 26 is a flow-chart of the resource allocation process for a load balancer for use with a cable based network.

FIG. 26 is a diagram showing the steps required to configure a new interactive session based on input from a user. This diagram depicts only those items that must be allocated or managed or used to do the allocation or management. A typical request would follow the steps listed below:

(1) The Set Top 2609 requests content 2610 from the Controller 2607

(2) The Controller 2607 requests QAM bandwidth 2620 from the SRM 2603

(3) The SRM 2603 checks QAM availability 2625

(4) The SRM 2603 allocates the QAM modulator 2630

(5) The QAM modulator returns confirmation 2635

(6) The SRM 2603 confirms QAM allocation success 2640 to the Controller (7) The Controller 407 allocates the Session processor 2650

(8) The Session processor confirms allocation success 2653

(9) The Controller 2607 allocates the content 2655

(10) The Controller 2607 configures 2660 the Set Top 2609. This includes:
 a. Frequency to tune
 b. Programs to acquire or alternatively PIDs to decode
 c. IP port to connect to the Session processor for keystroke capture

(11) The Set Top 2609 tunes to the channel 2663

(12) The Set Top 2609 confirms success 2665 to the Controller 2607 The Controller 2607 allocates the resources based on a request for service from a set top box 2609. It frees these resources when the set top or server sends an "end of session". While the controller 2607 can react quickly with minimal delay, the SRM 2603 can only allocate a set number of QAM sessions per second i.e. 200. Demand that exceeds this rate results in unacceptable delays for the user. For example, if 500 requests come in at the same time, the last user would have to wait 5 seconds before their request was granted. It is also possible that rather than the request being granted, an error message could be displayed such as "service unavailable".

While the example above describes the request and response sequence for an AVDN session over a cable TV network, the example below describes a similar sequence over an IPTV network. Note that the sequence in itself is not a claim, but rather illustrates how AVDN would work over an IPTV network.

(1) Client device requests content from the Controller via a Session Manager (i.e. controller proxy).

(2) Session Manager forwards request to Controller.

(3) Controller responds with the requested content via Session Manager (i.e. client proxy).

(4) Session Manager opens a unicast session and forwards Controller response to client over unicast IP session.

(5) Client device acquires Controller response sent over unicast IP session.

(6) Session manager may simultaneously narrowcast response over multicast IP session to share with other clients on node group that request same content simultaneously as a bandwidth usage optimization technique.

Figure 27:
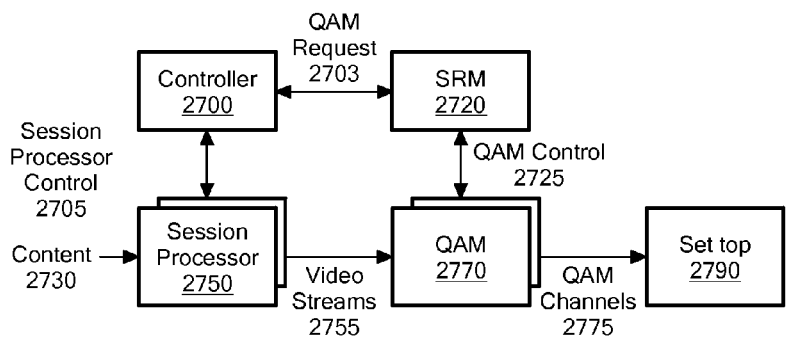
FIG. 27 is a system diagram used to show communication between cable network elements for load balancing.

FIG. 27 is a simplified system diagram used to break out each area for performance improvement. This diagram focuses only on the data and equipment that will be managed and removes all other non-managed items. Therefore, the switch, return path, combiner, etc. are removed for the sake of clarity. This diagram will be used to step through each item, working from the end user back to the content origination.

A first issue is the assignment of QAMs 2770 and QAM channels 2775 by the SRM 2720. In particular, the resources must be managed to prevent SRM overload, that is, eliminating the delay the user would see when requests to the SRM 2720 exceed its sessions per second rate.

To prevent SRM "overload", "time based modeling" may be used. For time based modeling, the Controller 2700 monitors the history of past transactions, in particular, high load periods. By using this previous history, the Controller 2700 can predict when a high load period may occur, for example, at the top of an hour. The Controller 2700 uses this knowledge to pre-allocate resources before the period comes. That is, it uses predictive algorithms to determine future resource requirements. As an example, if the Controller 2700 thinks 475 users are going to join at a particular time, it can start allocating those resources 5 seconds early so that when the load hits, the resources have already been allocated and no user sees a delay.

Secondly, the resources could be pre-allocated based on input from an operator. Should the operator know a major event is coming, e.g., a pay per view sporting event, he may want to pre-allocate resources in anticipation. In both cases, the SRM 2720 releases unused QAM 2770 resources when not in use and after the event.

Thirdly, QAMs 2770 can be allocated based on a "rate of change" which is independent of previous history. For example, if the controller 2700 recognizes a sudden spike in traffic, it can then request more QAM bandwidth than needed in order to avoid the QAM allocation step when adding additional sessions. An example of a sudden, unexpected spike might be a button as part of the program that indicates a prize could be won if the user selects this button.

Currently, there is one request to the SRM 2720 for each session to be added. Instead the controller 2700 could request the whole QAM 2770 or a large part of a single QAM's bandwidth and allow this invention to handle the data within that QAM channel 2775. Since one aspect of this system is the ability to create a channel that is only 1, 2, or 3 Mb/sec, this could reduce the number of requests to the SRM 2720 by replacing up to 27 requests with a single request.

The user will also experience a delay when they request different content even if they are already in an active session. Currently, if a set top 2790 is in an active session and requests a new set of content 2730, the Controller 2700 has to tell the SRM 2720 to de-allocate the QAM 2770, then the Controller 2700 must de-allocate the session processor 2750 and the content 2730, and then request another QAM 2770 from the SRM 2720 and then allocate a different session processor 2750 and content 2730. Instead, the controller 2700 can change the video stream 2755 feeding the QAM modulator 2770 thereby leaving the previously established path intact. There are a couple of ways to accomplish the change. First, since the QAM Modulators 2770 are on a network so the controller 2700 can merely change the session processor 2750 driving the QAM 2770. Second, the controller 2700 can leave the session processor 2750 to set top 2790 connection intact but change the content 2730 feeding the session processor 2750, e.g., "CNN Headline News" to "CNN World Now". Both of these methods eliminate the QAM initialization and Set Top tuning delays.

Thus, resources are intelligently managed to minimize the amount of equipment required to provide these interactive services. In particular, the Controller can manipulate the video streams 2755 feeding the QAM 2770. By profiling these streams 2755, the Controller 2700 can maximize the channel usage within a QAM 2770. That is, it can maximize the number of programs in each QAM channel 2775 reducing wasted bandwidth and the required number of QAMs 2770. There are three primary means to profile streams: formulaic, pre-profiling, and live feedback.

The first profiling method, formulaic, consists of adding up the bit rates of the various video streams used to fill a QAM channel 2775. In particular, there may be many video elements that are used to create a single video stream 2755. The maximum bit rate of each element can be added together to obtain an aggregate bit rate for the video stream 2755. By monitoring the bit rates of all video streams 2755, the Controller 2700 can create a combination of video streams 2755 that most efficiently uses a QAM channel 2775. For example, if there were four video streams 2755: two that were 16 Mb/sec and two that were 20 Mb/sec then the controller could best fill a 38.8 Mb/sec QAM channel 2775 by allocating one of each bit rate per channel. This would then require two QAM channels 2775 to deliver the video. However, without the formulaic profiling, the result could end up as 3 QAM channels 2775 as perhaps the two 16 Mb/sec video streams 2755 are combined into a single 38.8 Mb/sec QAM channel 2775 and then each 20 Mb/sec video stream 2755 must have its own 38.8 Mb/sec QAM channel 2775.

A second method is pre-profiling. In this method, a profile for the content 2730 is either received or generated internally. The profile information can be provided in metadata with the stream or in a separate file. The profiling information can be generated from the entire video or from a representative sample. The controller 2700 is then aware of the bit rate at various times in the stream and can use this information to effectively combine video streams 2755 together. For example, if two video streams 2755 both had a peak rate of 20 Mb/sec, they would need to be allocated to different 38.8 Mb/sec QAM channels 2775 if they were allocated bandwidth based on their peaks. However, if the controller knew that the nominal bit rate was 14 Mb/sec and knew their respective profiles so there were no simultaneous peaks, the controller 2700 could then combine the streams 2755 into a single 38.8 Mb/sec QAM channel 2775. The particular QAM bit rate is used for the above examples only and should not be construed as a limitation.

A third method for profiling is via feedback provided by the system. The system can inform the controller 2700 of the current bit rate for all video elements used to build streams and the aggregate bit rate of the stream after it has been built. Furthermore, it can inform the controller 2700 of bit rates of stored elements prior to their use. Using this information, the controller 2700 can combine video streams 2755 in the most efficient manner to fill a QAM channel 2775.

It should be noted that it is also acceptable to use any or all of the three profiling methods in combination. That is, there is no restriction that they must be used independently.

The system can also address the usage of the resources themselves. For example, if a session processor 2750 can support 100 users and currently there are 350 users that are active, it requires four session processors. However, when the demand goes down to say 80 users, it would make sense to reallocate those resources to a single session processor 2750, thereby conserving the remaining resources of three session processors. This is also useful in failure situations. Should a resource fail, the invention can reassign sessions to other resources that are available. In this way, disruption to the user is minimized.

The system can also repurpose functions depending on the expected usage. The session processors 2750 can implement a number of different functions, for example, process video, process audio, etc. Since the controller 2700 has a history of usage, it can adjust the functions on the session processors 2700 to meet expected demand. For example, if in the early afternoons there is typically a high demand for music, the controller 2700 can reassign additional session processors 2750 to process music in anticipation of the demand. Correspondingly, if in the early evening there is a high demand for news, the controller 2700 anticipates the demand and reassigns the session processors 2750 accordingly. The flexibility and anticipation of the system allows it to provide the optimum user experience with the minimum amount of equipment. That is, no equipment is idle because it only has a single purpose and that purpose is not required.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A system allowing for interactivity with video content that is transmitted to a client device as compressed video content, wherein the compressed video content includes a plurality of composited video frames, the system comprising:
a processor located remotely from the client device for controlling an interactive session with the client device and maintaining state information about a first compressed graphical element within the compressed video content, wherein the state information comprises a state of the first compressed graphical element, and wherein the state is configured to be associated with a user input operation performed with respect to the first compressed graphical element; and
a stitcher responsive to the processor for stitching together, in a frequency domain, at least the first compressed graphical element and a second compressed graphical element to form a new composited video frame;
wherein when the processor receives a signal requesting a change in state of the first compressed graphical element, the processor retrieves a new compressed graphical element indicative of the state change of the first compressed graphical element and the stitcher stitches the new compressed graphical element with the second compressed graphical element in the frequency domain to form a new composited video frame defining new compressed video content to be transmitted to the client device.

2. A system according to claim 1, further comprising:
a transmitter for transmitting the new compressed video content to the requesting client device.

3. A system according to claim 1, wherein the first graphical element is one or more MPEG encoded video frames.

4. A system according to claim 1 wherein each of the graphical elements are block-based transform encoded.

5. The system of claim 1, wherein the state of the first compressed graphical element indicates an on state or an off state of the first compressed graphical element.

6. The system of claim 1, wherein the state of the first compressed graphical element indicates whether a video program within the compressed video content is playing or stopped.

7. The system of claim 1, wherein when the processor receives a signal requesting a change in state of the first compressed graphical element, the processor further executes a script.

8. The system of claim 7, wherein the script includes instructions for:
determining if a video program within the compressed video content is playing or stopped;
if the video program is playing, executing an operation such that the video program stops playing; and
if the video program is stopped, executing an operation such that the video program resumes playing.

9. The system of claim 1, wherein when the processor receives a signal requesting a change in state of the first compressed graphical element, the processor further executes a call to an external program.

10. A method for creating a custom MPEG mosaic, the method comprising:
receiving a request from a requesting client device for a custom MPEG mosaic containing a number of video sources including at least a first video source and a second video source, wherein the first and second video sources are video streams of different broadcast channels;
receiving one or more groomed MPEG content streams including the first video source and the second video source;
stitching the groomed MPEG content streams including the first video source and the second video source with a background, without transform decoding the first video source and the second video source into a spatial domain, thereby creating a sequence of MPEG mosaic frames configured to simultaneously present the first and second video sources; and
transmitting the sequence of MPEG mosaic frames to the requesting client device as an MPEG elementary stream.

11. The method of claim 10, wherein the first video source includes user selected material and the second video source includes material selected by a processing office.

12. The method of claim 11, wherein the material selected by the processing office includes one or more advertisements.

13. The method of claim 10, further comprising:
receiving a request from a requesting client device to edit the custom MPEG mosaic;
receiving an additional groomed MPEG content stream including a third video source;
replacing the first video source with the third video source by stitching the additional groomed MPEG content stream including the third video source with the one or more groomed MPEG content streams including the second video source, without transform decoding the second video source and the third video source into a spatial domain, thereby creating a new sequence of MPEG mosaic frames wherein the second and third video sources are presented simultaneously;
transmitting the new sequence of MPEG mosaic frames to the requesting client device as an MPEG elementary stream.

14. The method of claim 10, further comprising:
receiving a request from a requesting client device to edit the custom MPEG mosaic;
receiving an additional groomed MPEG content stream including a third video source;
stitching the additional groomed MPEG content stream including the third video source with the one or more groomed MPEG content streams including the first video source and the second video source, without transform decoding the first, second, and third video sources into a spatial domain, thereby creating a new sequence of MPEG mosaic frames wherein the first, second, and third video sources are presented simultaneously;
transmitting the new sequence of MPEG mosaic frames to the requesting client device as an MPEG elementary stream.

15. The method of claim 10, wherein each of the one or more groomed MPEG content streams includes a plurality of intracoded MPEG P-frames.

* * * * *